US012161930B2

United States Patent
Doerksen et al.

(10) Patent No.: US 12,161,930 B2
(45) Date of Patent: Dec. 10, 2024

(54) SELF-STABILIZING SKATEBOARD

(71) Applicant: Future Motion, Inc., Santa Cruz, CA (US)

(72) Inventors: Kyle Jonathan Doerksen, Santa Cruz, CA (US); Beau Robertson, Santa Cruz, CA (US); Phil Rullman, Flagstaff, AZ (US); Ximena Prugue, Santa Cruz, CA (US); Daniel Blachinsky, Squamish (CA)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 18/434,478

(22) Filed: Feb. 6, 2024

(65) Prior Publication Data

US 2024/0342583 A1     Oct. 17, 2024

Related U.S. Application Data

(63) Continuation of application No. 18/174,436, filed on Feb. 24, 2023, now Pat. No. 11,890,530, which is a continuation of application No. 17/695,586, filed on Mar. 15, 2022, now Pat. No. 11,590,409, which is a continuation of application No. 17/506,551, filed on Oct. 20, 2021, now Pat. No. 11,273,364.

(60) Provisional application No. 63/217,162, filed on Jun. 30, 2021.

(51) Int. Cl.
| | |
|---|---|
| A63C 17/12 | (2006.01) |
| A63C 17/01 | (2006.01) |
| B62K 11/00 | (2006.01) |

(52) U.S. Cl.
CPC ............ *A63C 17/12* (2013.01); *A63C 17/016* (2013.01); *B62K 11/007* (2016.11); *A63C 2203/08* (2013.01); *A63C 2203/12* (2013.01); *A63C 2203/18* (2013.01)

(58) Field of Classification Search
CPC ....... A63C 17/12; A63C 17/016; A63C 17/08; B62K 11/007
See application file for complete search history.

(56) References Cited

U.S. PATENT DOCUMENTS

| | | | | |
|---|---|---|---|---|
| 10,456,658 | B1 * | 10/2019 | Doerksen | G01C 19/42 |
| 11,045,712 | B1 * | 6/2021 | Orehek | A63C 17/12 |
| 11,273,364 | B1 * | 3/2022 | Doerksen | A63C 17/12 |
| 11,325,021 | B1 * | 5/2022 | McCosker | A63C 17/12 |
| 11,590,409 | B2 * | 2/2023 | Doerksen | A63C 17/016 |
| 2014/0326525 | A1 * | 11/2014 | Doerksen | A63C 17/26 180/181 |
| 2017/0088212 | A1 * | 3/2017 | Edney | B60W 40/13 |
| 2017/0361900 | A1 * | 12/2017 | Doerksen | B60K 7/0007 |
| 2018/0169506 | A1 * | 6/2018 | Ma | A63C 17/22 |
| 2020/0282293 | A1 * | 9/2020 | Turner | A63C 17/08 |

\* cited by examiner

*Primary Examiner* — Brian L Swenson
(74) *Attorney, Agent, or Firm* — Kolitch Romano Dascenzo Gates LLC

(57) ABSTRACT

A self-propelled, one-wheeled vehicle may include a board having two deck portions each having a concave front footpad configured to receive a foot of a rider, and a wheel assembly disposed between the deck portions. The concave front footpad has a rider detection sensor in the form of a membrane switch conforming to the shape of the footpad (e.g., facilitated by one or more slots formed in the membrane switch). A motor assembly drives the vehicle in response to board orientation and rider detection information.

20 Claims, 20 Drawing Sheets

SELF-STABILIZING SKATEBOARD

CROSS-REFERENCES

The following applications and materials are incorporated herein, in their entireties, for all purposes: U.S. Provisional Patent Application Ser. No. 63/217,162, filed Jun. 30, 2021; U.S. patent application Ser. No. 17/506,551, now U.S. Pat. No. 11,273,364; U.S. patent application Ser. No. 17/695,586, filed Mar. 15, 2022, now U.S. Pat. No. 11,590,409; U.S. patent application Ser. No. 18/174,436, filed Feb. 24, 2023.

FIELD

This disclosure relates to self-stabilizing electric vehicles. More specifically, the disclosed embodiments relate to self-stabilizing tiltable skateboards having improved mechanical and electronic control systems.

SUMMARY

The present disclosure provides systems, apparatuses, and methods relating to self-stabilizing skateboards. In some examples, In some examples, a self-balancing electric vehicle includes: a wheel assembly including a wheel having an axis of rotation; a board including a central opening to accommodate the wheel, such that the board is tiltable about the wheel, first and second deck portions of the board each configured to receive a left or right foot of a rider oriented generally parallel to the axis of rotation of the wheel; a rider detection sensor comprising a membrane switch having one or more pressure transducers, wherein the membrane switch is disposed on a first footpad of the first deck portion; an electric hub motor configured to drive the wheel; and a controller configured to receive orientation information indicating an orientation of the board and to cause the hub motor to propel the board based on the orientation information and on rider detection information from the rider detection sensor; wherein the first footpad has a concave-up profile in a direction parallel to the axis of rotation of the wheel, and the membrane switch conforms to the concave-up profile of the first footpad.

In some examples, a self-balancing electric vehicle includes: a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board; a wheel assembly including a wheel rotatable about an axle, wherein the wheel is disposed between and extends above and below the first and second deck portions; a rider detection sensor comprising a membrane switch, wherein the membrane switch is disposed on a first footpad of the first deck portion; a motor assembly configured to rotate the wheel about the axle to propel the vehicle; and an electronic controller configured to receive orientation information indicating an orientation of the board and to cause the motor assembly to propel the vehicle based on the orientation information and on rider detection information from the rider detection sensor; wherein the first footpad has a concave-up profile in a heel-toe direction, and the membrane switch conforms to the concave-up profile of the first footpad.

In some examples, a self-balancing electric vehicle includes: a wheel assembly including a wheel driven by a hub motor about an axle; a board including an aperture to accommodate the wheel, such that the board is tiltable about the wheel, first and second deck portions of the board each configured to receive a left or right foot of a rider oriented generally parallel to the axle; a rider detection sensor comprising a membrane switch, wherein the membrane switch is disposed on a first footpad of the first deck portion; and a controller configured to cause the hub motor to propel the board based on board orientation information and on rider detection information from the rider detection sensor; wherein the first footpad has a concave-up profile in a direction parallel to the axle, and the membrane switch conforms to the concave-up profile of the first footpad.

Features, functions, and advantages may be achieved independently in various embodiments of the present disclosure, or may be combined in yet other embodiments, further details of which can be seen with reference to the following description and drawings.

DETAILED DESCRIPTION

Figure 1:
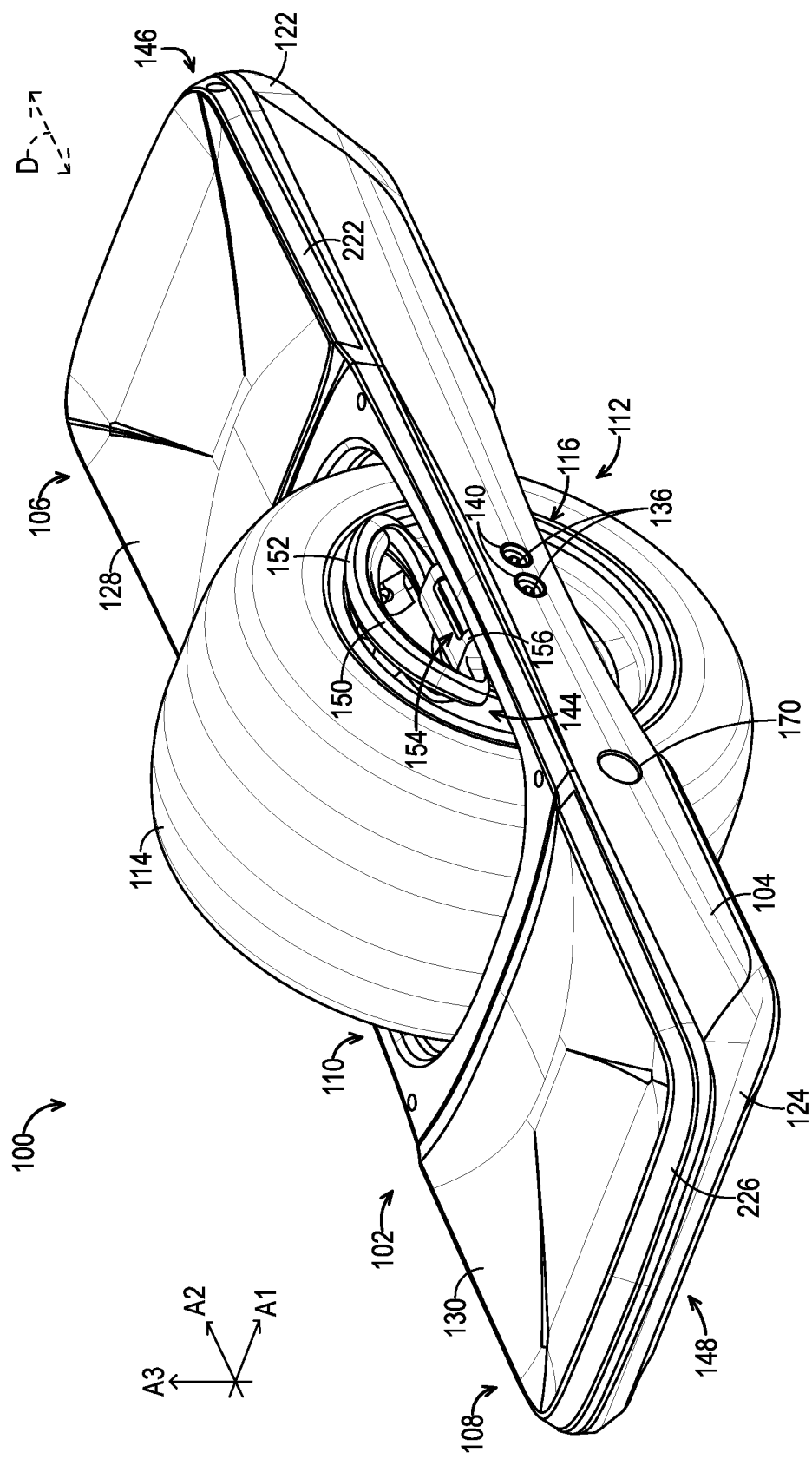
FIG. 1 is an isometric view of an illustrative one-wheeled skateboard in accordance with aspects of the present disclosure.

Various aspects and examples of a self-stabilizing skateboard, as well as related methods, are described below and illustrated in the associated drawings. Unless otherwise specified, a self-stabilizing skateboard in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a self-balancing skateboard in accordance with the present teachings may include a board having a two deck portions on either side of a central opening. In examples described below, each deck portion is configured to support a respective foot of a user oriented as on a standard skateboard, such that the vehicle is ridden with the user facing approximately ninety degrees to the direction of travel. A single wheel (or side-by-side wheels) is supported in the central opening on an axle and driven by a motor (e.g., a hub motor). The board is therefore tiltable about the axis of the wheel (i.e., about an axis of rotation defined by the axle). An onboard electronic controller is configured to receive orientation information indicating an orientation of the board. In response to this orientation information, the controller causes the hub motor to propel the board, and provides a self-stabilizing feature.

In some examples, the skateboard includes a handle pivotably coupled to a portion of the board, such as to an axle mounting block of the board. The handle can be pivoted between a stowed configuration and a deployed configuration. In the stowed configuration, the handle is flipped up (or in some examples down) adjacent the hub motor. In the deployed configuration, the handle is pivoted down (or up) to extend away from the hub motor and provide a graspable carrying handle for the user.

In some examples, the vehicle has a fender, which is interchangeable with a substitute "fender delete," which covers the connection points of the fender to the vehicle but does not extend to cover the vehicle wheel. The fender is removably coupled to a frame of the board and spans the opening between the deck portions. The fender has an arched portion covering an upper surface of the tire and a peripheral flange extending around the opening. The fender delete has a similar appearance, without the arched portion. In other words, it surrounds the periphery of the opening but does not overarch the tire or wheel.

In some examples, the vehicle includes a status indicator (e.g., a battery charge indicator) including a plurality of illuminators viewable through a slot formed in an upper surface of the board. This enables easy viewing for the rider.

The vehicle includes footpads having concave upper surfaces configured to reduce foot fatigue and improve user control. One or more sensors embedded within the concave footpads have a three-dimensional shape to conform to the footpad concavity, and are configured to provide rider detection functionality.

In some examples, the footpad sensors comprise a plastic laminate which can bend or curve in one direction but cannot easily bend in a compound curvature, e.g., without damaging internal circuitry. To accommodate the compound curvature of the concave footpad surface, slots (AKA "cuts," "slits," "isolines," or "channels") are provided along specific lines (e.g., diagonal from the outer corners). The slots facilitate conforming to the compound curvature of the footpad while relieving stress on the membrane.

In some examples, the footpad surface provides a concave surface by creating multiple regions, wherein each region has substantial curvature only in a single direction. In some examples, sensor traces of the membrane switch are aligned with the direction of curvature to prevent buckling. In some examples, ribs or ridges protrude from the footpad surface to fill in or retain the sensor slots. In some examples, computational flattening is utilized to convert the desired curved surface of the membrane into a flat pattern for manufacturing.

In some examples, the concave footpads include at least two portions: a rigid substrate (e.g., plastic) and a resilient layer (e.g., rubber or foam) disposed thereon. The rigid substrate may comprise a thermoplastic polymer, e.g., acrylonitrile butadiene styrene (ABS), polyethylene (PE), polyvinyl chloride (PVC), and/or another suitable material. The resilient layer may comprise an elastomer, e.g., a synthetic and/or natural rubber or another suitably resilient material, e.g., a high density foam. In some examples, the resilient layer may include a plurality of downward-facing protrusions configured to be received in corresponding apertures in the rigid substrate to provide additional mechanical stability. In some examples, these protrusions are formed during an overmolding or injection molding process. In some examples, the injection molding process results in portions of the resilient layer passing through and around apertures and features of the underlying rigid substrate, such that the resilient layer and the rigid substrate cannot be separated mechanically in a nondestructive manner.

Aspects of the control systems described herein (e.g., electronic controllers, motor controllers, etc.) may be embodied as a computer method, computer system, or computer program product. Accordingly, aspects of the present control systems may include processing logic and may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the present control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative self-stabilizing skateboards, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electric Vehicle

As shown in FIGS. 1-22, this section describes an illustrative electric vehicle 100. Vehicle 100 is an example of the electric vehicles described in the Overview. FIGS. 1-8 show vehicle 100 from various viewpoints. FIGS. 9-22 are various sectional views, exploded views, and other views showing arrangements of components of the vehicle.

Vehicle 100 is a single-wheeled, self-stabilizing skateboard including a board 102 (AKA a tiltable portion of the vehicle, a platform, and/or a foot deck) having a frame 104 supporting a first deck portion 106 and a second deck portion 108 defining an opening 110 therebetween. Board 102 may generally define a plane. Each deck portion 106, 108 (or foot pad portion thereof) is configured to receive and support a left or right foot of a rider oriented generally perpendicular to a direction of travel of the board (see FIGS. 1 and 2), the direction of travel generally indicated at D. First and second deck portions 106, 108 may be formed of a same physical piece, may be unitary with the frame, or may be separate pieces. First and second deck portions 106, 108 may be included in the definition of board 102.

Vehicle 100 includes a wheel assembly 112 having a rotatable ground-contacting element 114 (e.g., a tire, wheel, or continuous track) disposed between and extending above first and second deck portions 106, 108, and a motor assembly 116 configured to rotate ground-contacting element 114 to propel the vehicle. As shown in FIG. 1 and elsewhere, vehicle 100 may include exactly one ground-contacting element, disposed between the first and second deck portions. In some examples, vehicle 100 may include a plurality of ground-contacting elements (e.g., coaxial wheels).

Wheel assembly 112 is disposed between first and second deck portions 106, 108, and ground-contacting element 114 is coupled to motor assembly 116. Motor assembly 116 includes an axle 126 (AKA a shaft), which couples motor assembly 116 to board 102, e.g., by one or more axle mounts and one or more fasteners, such as a plurality of bolts. In some examples, axle 126 is coupled to board 102 by way of a suspension system. In some examples, motor assembly 116 is configured to rotate ground-contacting element 114 around (or about) axle 126 to propel vehicle 100. For example, motor assembly 116 may include an electric motor, such as an electric hub motor, configured to rotate ground-contacting element 114 about axle 126 to propel vehicle 100 along the ground. For convenience, ground-contacting element 114 is hereinafter referred to as a tire or wheel, although other suitable embodiments may be provided.

First and second deck portions 106, 108 are located on opposite sides of wheel assembly 112, with elongate board 102 being dimensioned to approximate a skateboard. In some embodiments, the board approximates a longboard skateboard, snowboard, surfboard, or may be otherwise desirably dimensioned. In some examples, deck portions 106, 108 of board 102 are at least partially covered with non-slip material portions 128, 130 (e.g., grip tape or other textured material) to aid in rider control and protect underlying components.

Frame 104 may include any suitable structure configured to rigidly support the deck portions and to be coupled (directly or indirectly) to the axle of the wheel assembly, such that the weight of a rider is supported on tiltable board 102, and the board has a fulcrum at the axle. Frame 104 may include one or more frame members 118, on which deck portions 106 and 108 may be mounted, and which may further support additional elements and features of the vehicle, such as a charging port 172, a switch 170, and end bumpers 122, 124, as well as lighting assemblies, battery and electrical systems, electronics, controllers, and the like (see, e.g., FIG. 22 and corresponding description below).

Deck portions 106 and 108 may include any suitable structures configured to support the feet of a rider, such as non-skid surfaces 128, 130, as well as vehicle-control features, such as various sensors and a rider detection system 168. In some examples, the rider detection system includes a rider detection sensor in the form of a pressure switch or a strain gauge in communication with a controller of the vehicle. The rider detection sensor may include a plurality of pressure switches housed in a waterproof casing to form a membrane switch. Deck portions 106 and 108, as well as related features, are described in further detail below.

Shaft or axle 126 of motor assembly 116 is coupled to frame 104, as shown in FIG. 1. For example, the axle may be directly attached to frame 104, or may be coupled to the frame at each end through a respective connection or axle mounting block 132, 134 (also referred to as an axle mount or a simply a mounting block). Axle 126 may be bolted or otherwise affixed to mounting blocks 132, 134, e.g., at either end, which in turn may be bolted or affixed to frame 104 using suitable fasteners (e.g., by bolts 136, 138). Through-holes 140, 142 may be provided in frame 104 for receiving fasteners of the axle and mounting blocks, thereby securing the components together. In some examples, as mentioned above, axle 126 is coupled to frame 104 by a suspension system (not shown).

Vehicle 100 has a pitch axis A1, a roll axis A2, and a yaw axis A3 (see FIG. 1). Pitch axis A1 is the axis about which tire 114 is rotated by motor assembly 116. For example, pitch axis A1 may pass through axle 126 (e.g., pitch axis A1 may be parallel to and aligned with an elongate direction of axle 126). Roll axis A2 is perpendicular to pitch axis A1, and extends in direction D (i.e., the direction in which vehicle 100 is propelled by the motor assembly). For example, roll axis A2 may correspond to a long axis of board 102. Yaw axis A3 is perpendicular both to pitch axis A1 and to roll axis A2. Yaw axis A3 is normal to a plane defined by deck portions 106, 108, as shown in FIG. 1. Axes A1 and A2 are analogous to the Y and X axes (e.g., corresponding to horizontal), while axis A3 is analogous to the Z axis (e.g., corresponding to vertical). Pitch axis A1 and roll axis A2 may lie in a plane of the board. In some embodiments, the pitch and roll axes may define this plane.

Tire 114 may be wide enough in a heel-toe direction (e.g., in a direction parallel to pitch axis A1) that the rider can balance in the heel-toe direction manually, i.e., by shifting his or her own weight, without automated assistance from the vehicle. Tire 114 may be tubeless, or may be used with an inner tube. In some examples, tire 114 may be a non-pneumatic tire. For example, tire 114 may be "airless," solid, and/or may comprise a foam. Tire 114 may have a profile such that the rider can lean vehicle 100 over an edge of the tire (and/or pivot the board about roll axis A2 and/or yaw axis A3) through heel and/or toe pressure to facilitate cornering of vehicle 100.

Motor assembly 116 may include any suitable driver of tire/wheel 114, such as an electric hub motor 144 mounted within wheel 114. The hub motor may be internally geared or may be direct-drive. The use of a hub motor facilitates the elimination of chains and belts, and enables a form factor that considerably improves maneuverability, weight distribution, and aesthetics. Mounting tire 114 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

With continuing reference to FIGS. 1-8 and FIGS. 14-19, first bumper 122 (AKA the front bumper) is integrated into (or removably coupled to) a first end 146 of board 102 proximate first deck portion 106, and second bumper 124 (AKA the rear bumper) is integrated into (or removably coupled to) a second end 148 of board 102 proximal second deck portion 108. Bumpers 122, 124 may be referred to as skid pads, and may be replaceable and/or selectively removable. For example, the bumpers may include replaceable polymer parts or components, and/or may each be entirely replaceable as a single (e.g., monolithic) piece. In some examples, bumpers 122, 124 each comprise a thermoplastic polymer, such as acrylonitrile butadiene styrene (ABS). In some embodiments, the bumpers are configured to allow the rider to bring vehicle 100 to a stop in an angled orientation (e.g., by setting one end of the board against the ground after the rider removes their foot from a rider detection device or switch, which is described below in further detail). In this context, the bumpers may be configured to be abrasion-resistant and/or ruggedized.

First bumper 122 and/or second bumper 124 each include a bumper body 123 configured to form a distal, external end of board 102, and an expanse 125 extending from body 123 to form a lower external surface of board 102. In some examples, each lateral edge of expanse 125 includes a lengthwise channel 127 configured to slidingly mate with a corresponding inward protrusion 129 disposed along a discrete length of each of the respective side rails of frame 104. See FIG. 16, which is an end view of vehicle 100 with the bumper removed. This configuration enables body 123 of the bumper to be held to the frame by one or more removable fasteners at one end while the opposing end of the bumper is supported entirely by channels 127 and protrusions 129 (i.e., without additional fasteners).

Figure 17:
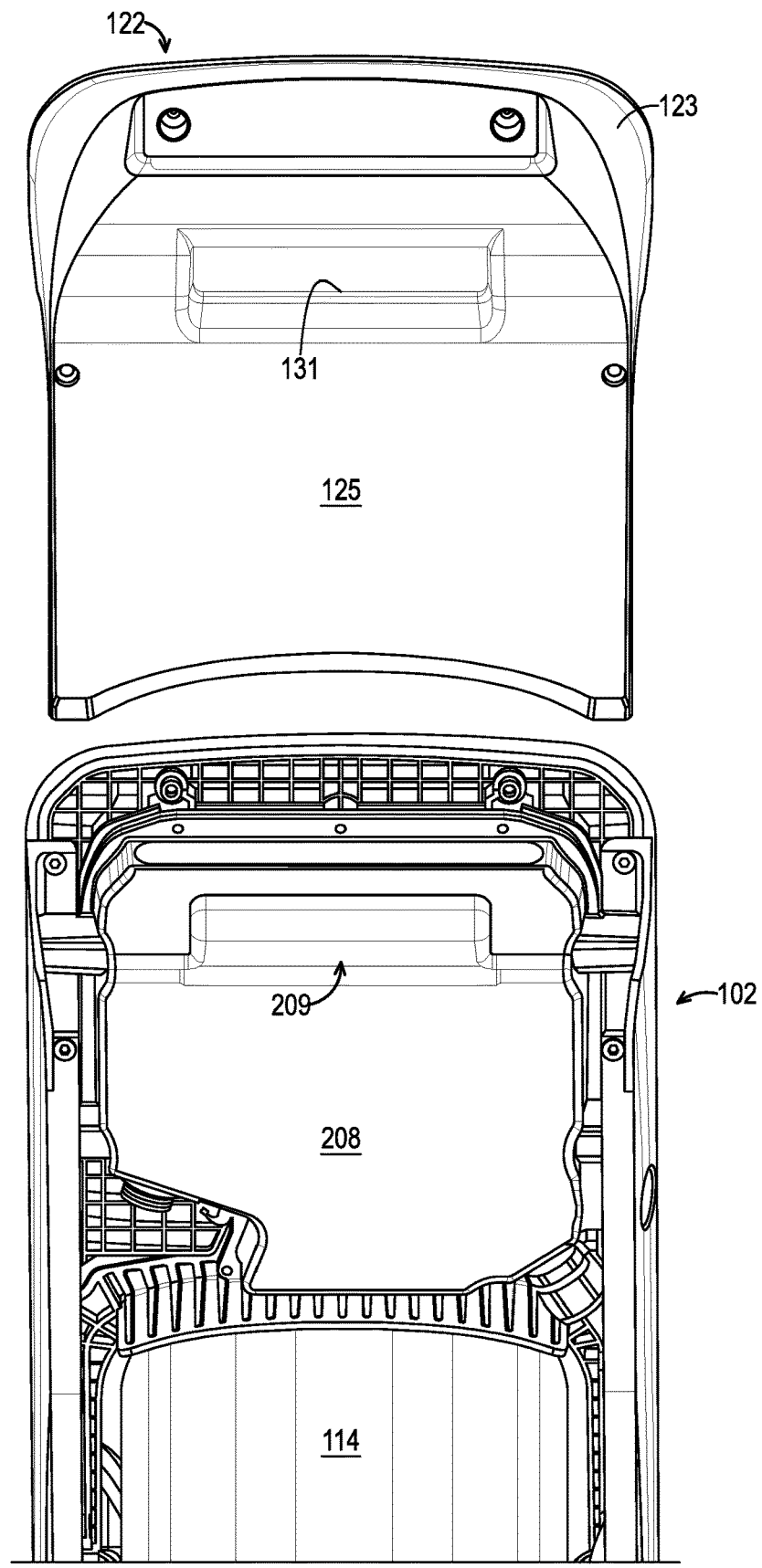
FIG. 17 is a partially exploded, bottom plan view depicting the bumper of FIG. 14.
Figure 18:
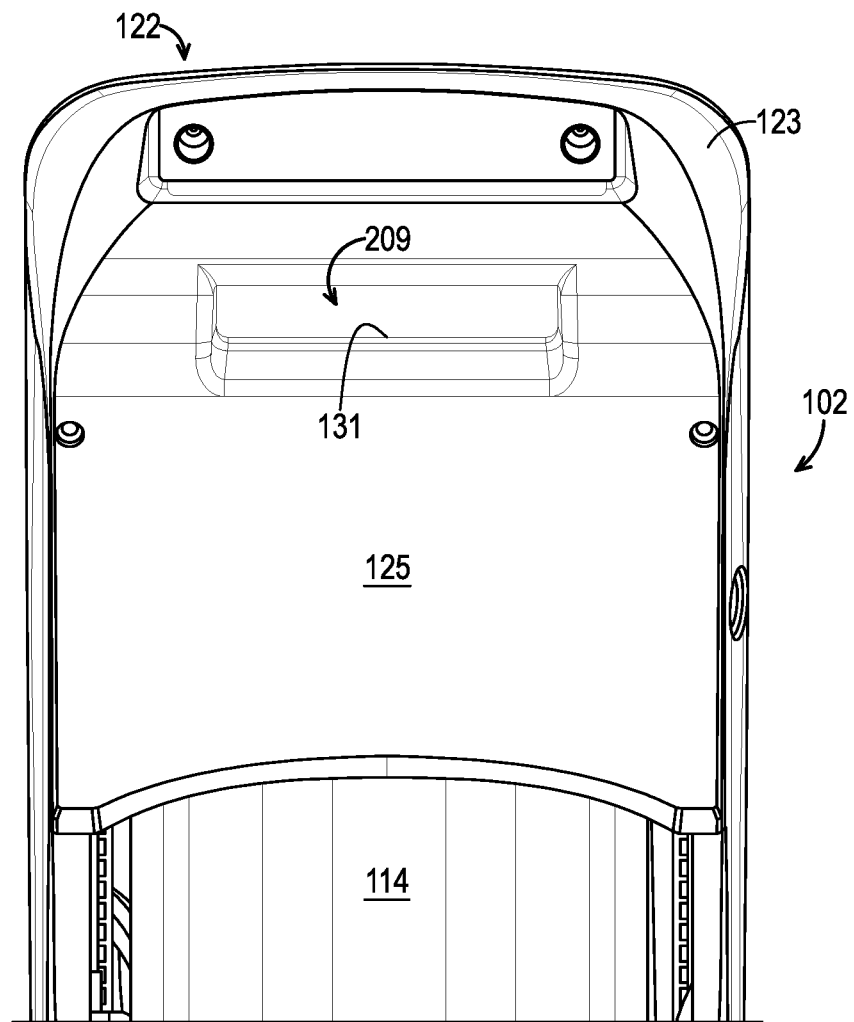
FIG. 18 is a bottom plan view of the first deck portion of FIG. 9.

As shown in FIGS. 17 and 18, expanse 125 of bumper 122 includes an aperture 131 forming a carrying handle. An electronics housing (AKA enclosure) 208, described further below, disposed above expanse 125 includes a corresponding recess 209 that is in registration with aperture 131 of the bumper when fully assembled, such that a user's fingers are received by aperture 131 and recess 209 when the vehicle is carried by this handle. Recess 209 is a blind hole (e.g., dead-ended) having dimensions corresponding to the aperture in the bumper expanse. In some examples, one or more portions of expanse 125 surrounding aperture 131 and portions of recess 209 configured to be grasped manually by the user are coated (e.g., overmolded) with a resilient material, e.g., a rubber or a soft plastic, to create a more comfortable grip.

Figure 19:
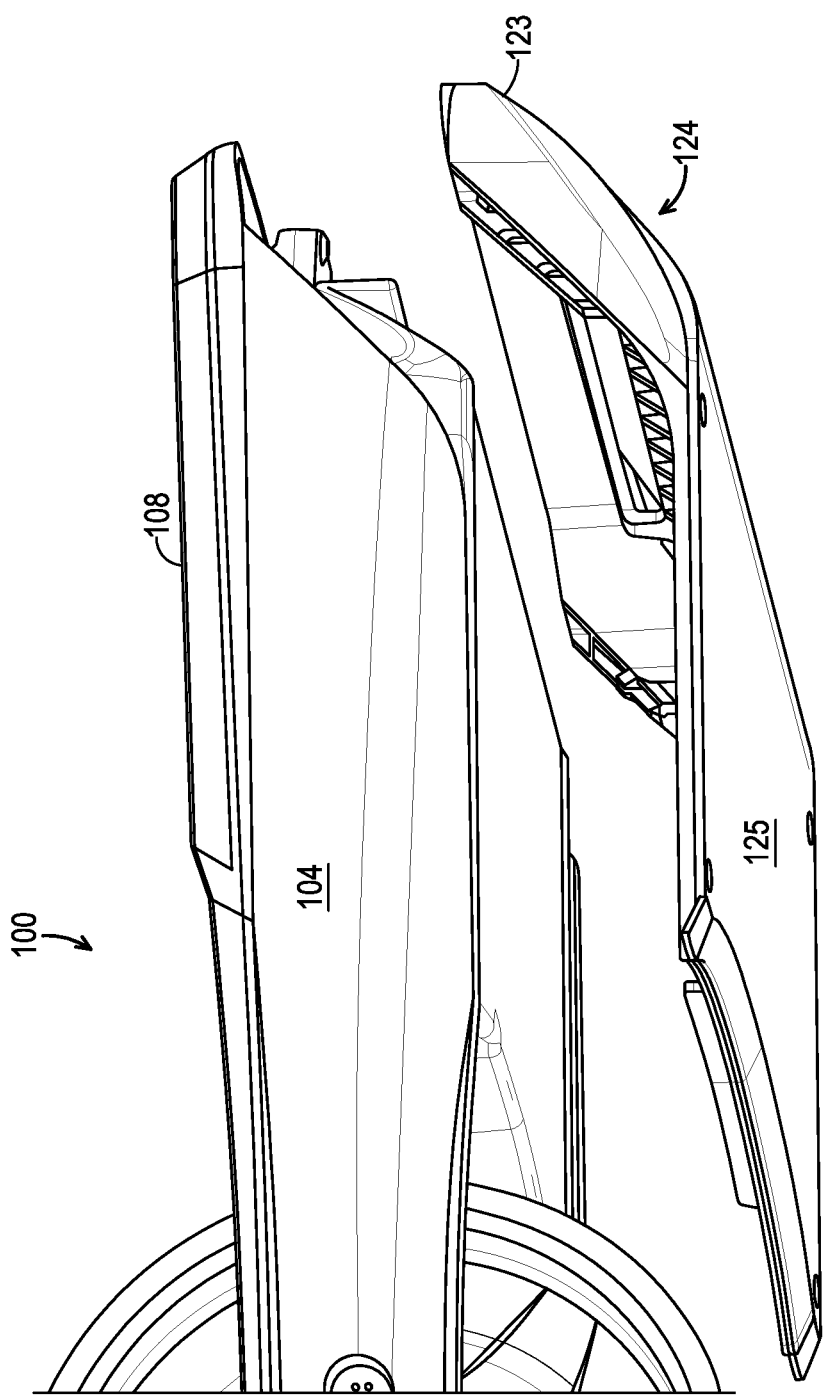
FIG. 19 is a partially exploded, isometric view depicting a bumper for use with a second deck portion of the skateboard of FIG. 1.

FIG. 19 is a partially exploded view of a rear end of vehicle 100, showing rear bumper 124 removed from the board. Bumper 124 includes body portion 123 and expanse 125, with a tab protruding upward from the end of the bumper to wrap around an enclosure (e.g., battery enclosure) internal to the board. Bumper 124 may be attached to board 102 using removable fasteners (e.g., screws or bolts) at the body end and along the expanse.

Figure 20:
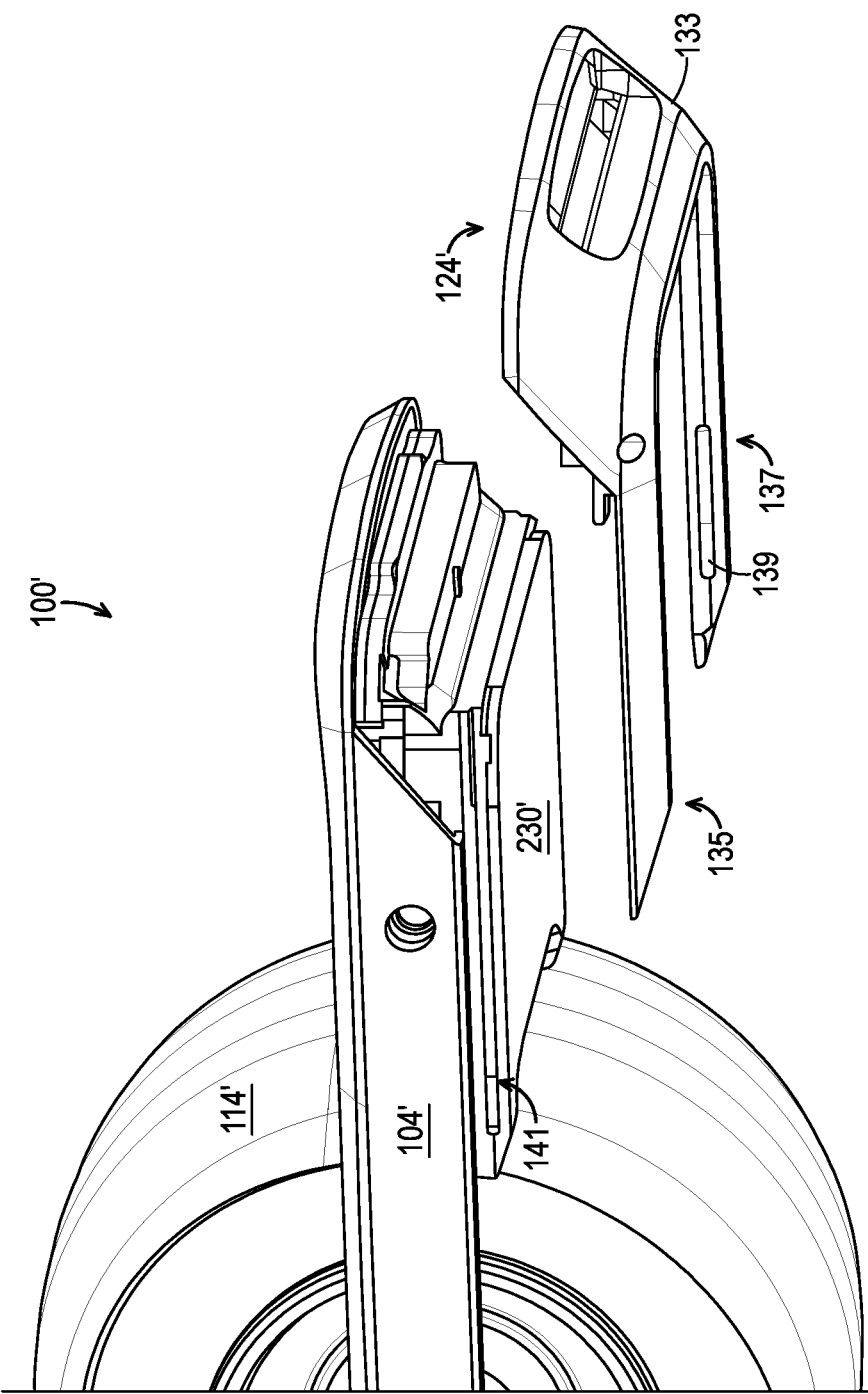
FIG. 20 is a partially exploded, isometric view depicting another bumper for use with the first or second deck portion of the skateboard of FIG. 1.
Figure 21:
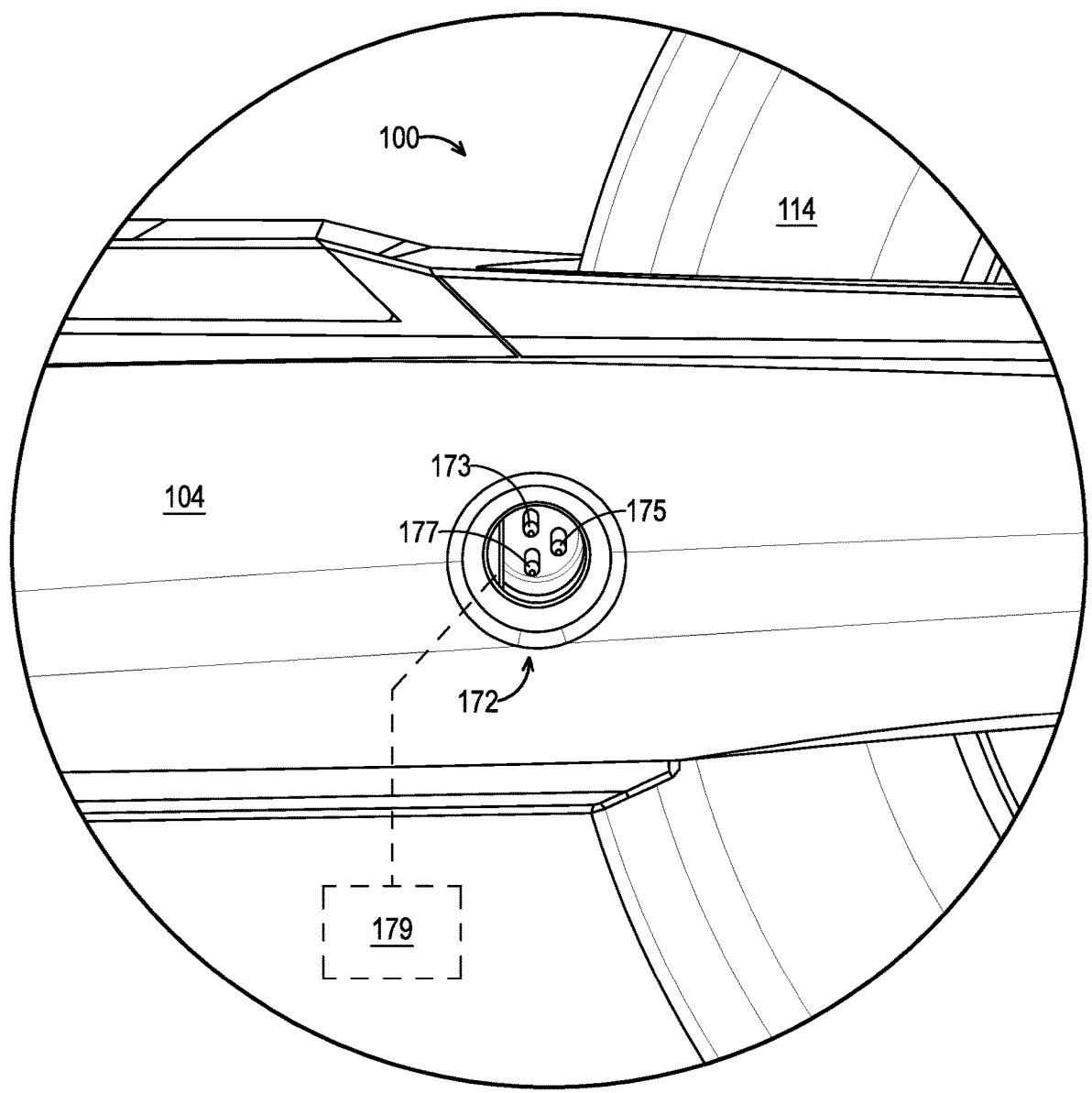
FIG. 21 is a side elevation view of a charging port of the skateboard of FIG. 1.

FIG. 20 depicts an alternative embodiment of a bumper 124', depicted on a vehicle 100'. Bumper 124' is generally U-shaped, having a body 133 configured to form an external end of the board. A pair of legs 135, 137 extend from the body to form lower longitudinal corners of the board, such that the upper surfaces of the legs of the bumper are in contact with the bottom edges of the side rails of a frame 104'.

Each leg 135, 137 includes an inward protrusion 139 running along a length (e.g., a discrete length) of each of the legs. Protrusion 139 is configured to slidingly mate with a corresponding lengthwise channel 141 of the vehicle, e.g., formed in a battery housing (AKA enclosure) 230' or other enclosure of the board. Body 133 of the bumper is coupled or held to the board by one or more removable fasteners, and distal ends (ends closest to tire 114') of legs 135, 137 are supported entirely by protrusions 139 and channels 141 (i.e., without fasteners). Bumper 124' may be provided or utilized in examples where a battery enclosure 230' extends downward farther than adjacent side rails of the vehicle frame. In these examples, channels 141 are disposed lower than the bottom edges of the side rails, and the enclosure extends between the two legs of the bumper to form an external surface of the board.

As shown in FIG. 1 and elsewhere, vehicle 100 further includes a stowable handle 150. Handle 150 is disposed on a lateral side of wheel 114, adjacent hub motor 144, and is transitionable between a first configuration, in which a graspable grip portion 152 of the handle is stowed in a position proximate the hub motor, and a second configuration, in which grip portion 152 is pivoted or folded into a position extending or protruding transverse to the stowed position, such that the grip portion may be engaged by a hand of the user to carry or transport the board. With the board in an operational position on a support surface, the grip of the handle may be substantially vertical in the first configuration (preventing breakage, interference with riding, etc.) and substantially horizontal in the second configuration. The first configuration may be referred to as the "stowed" position, the "up" position, the "riding" position, the "operational" position, the "undeployed" position, and/or the "in" position. The second configuration may be referred to as the "carrying" position, the "down" position, the "portable" position, the "deployed" position, and/or the "out" position.

In addition to grip portion 152, handle 150 includes a hinge 154 comprising hinge knuckles 156 configured to receive a hinge pin. Handle 150 may be pivotably coupled to any suitable fixed feature of the vehicle, such as the frame, fender, or axle block. In the example depicted in FIGS. 1-8, handle 150 is coupled to axle mounting block 134 by hinge 154, e.g., on an inboard upper side of the block. In some examples, a magnetic tab is configured to contact and be biased toward (i.e., attracted to) mounting block 134 to retain handle 150 while in the stowed position. In some examples, a spring-loaded hinge (e.g., using a torsion spring) may be utilized in addition to or instead of the magnet arrangement.

Components of handle 150 may be constructed using injection-molded plastic and/or machined or cast metal. Portions configured to be grasped manually by the user may be overmolded using a resilient material, e.g., a rubber or a soft plastic, to create a more comfortable grip.

Vehicle 100 may include any suitable apparatus, device, mechanism, and/or structure for preventing water, dirt, or other road debris from being transferred by the ground-contacting element to the rider. For example, vehicle 100 may include a fender (AKA a full fender) configured to fully cover an upper periphery of tire 114. The fender is coupled to frame 104, e.g., using fasteners and/or magnetic connectors, and configured to prevent debris from being transferred from tire 114 to the rider, such as when tire 114 is rotated about pitch axis A1.

Figure 2:
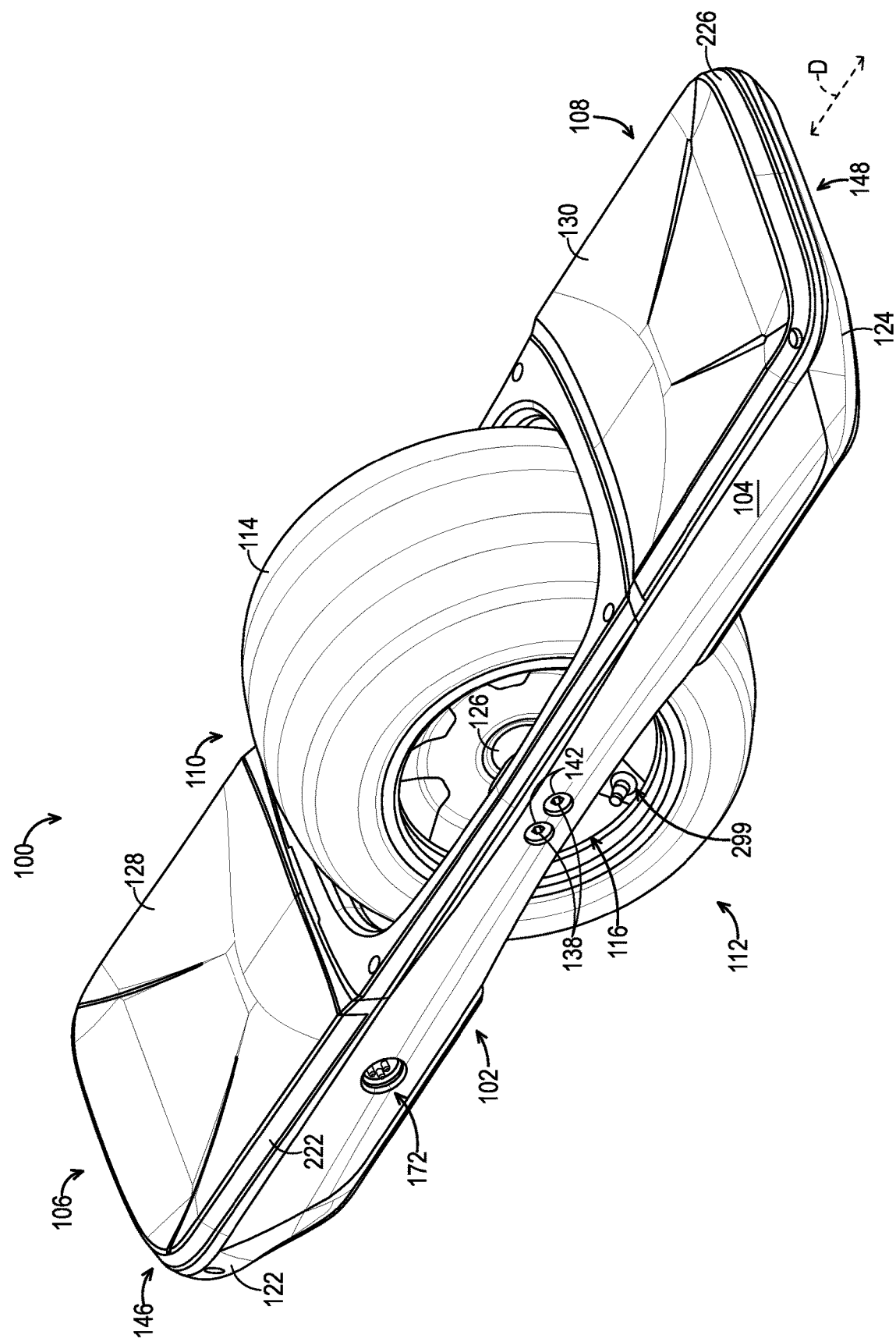
FIG. 2 is another isometric view of the skateboard of FIG. 1, taken from a different vantage point.
Figure 3:
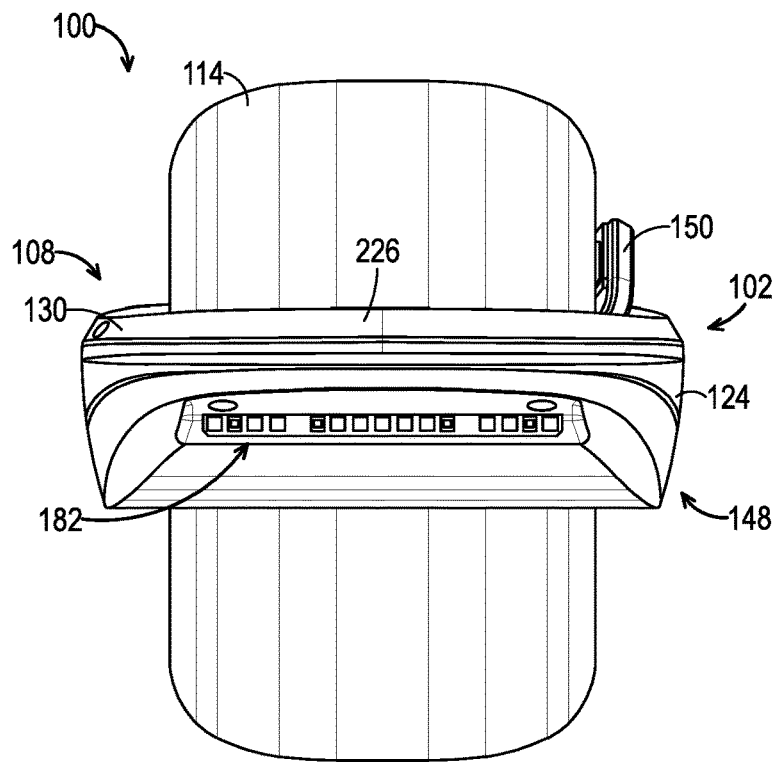
FIG. 3 is a first end elevation view of the skateboard of FIG. 1.
Figure 4:
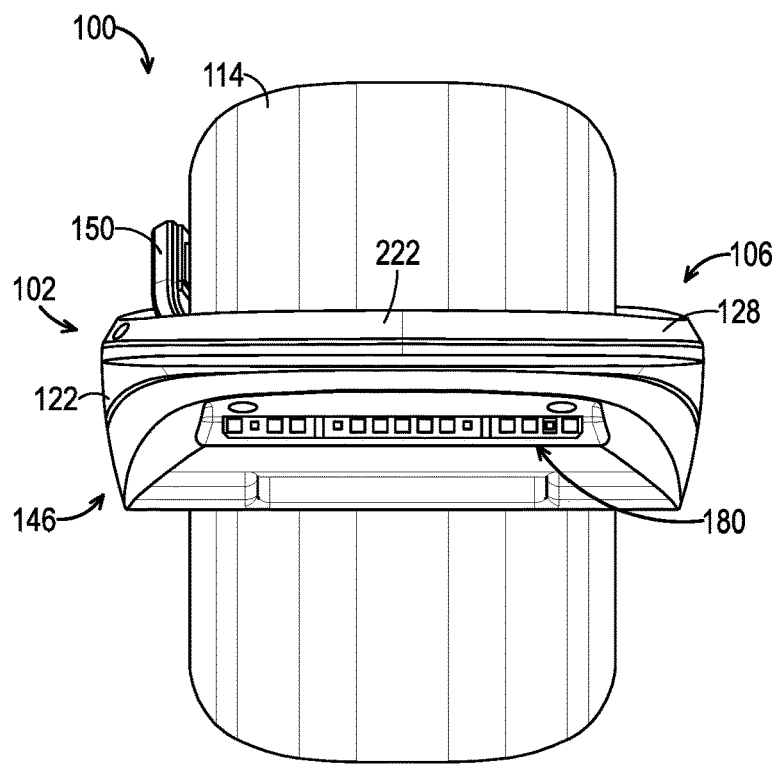
FIG. 4 is a second end elevation view of the skateboard of FIG. 1.
Figure 5:
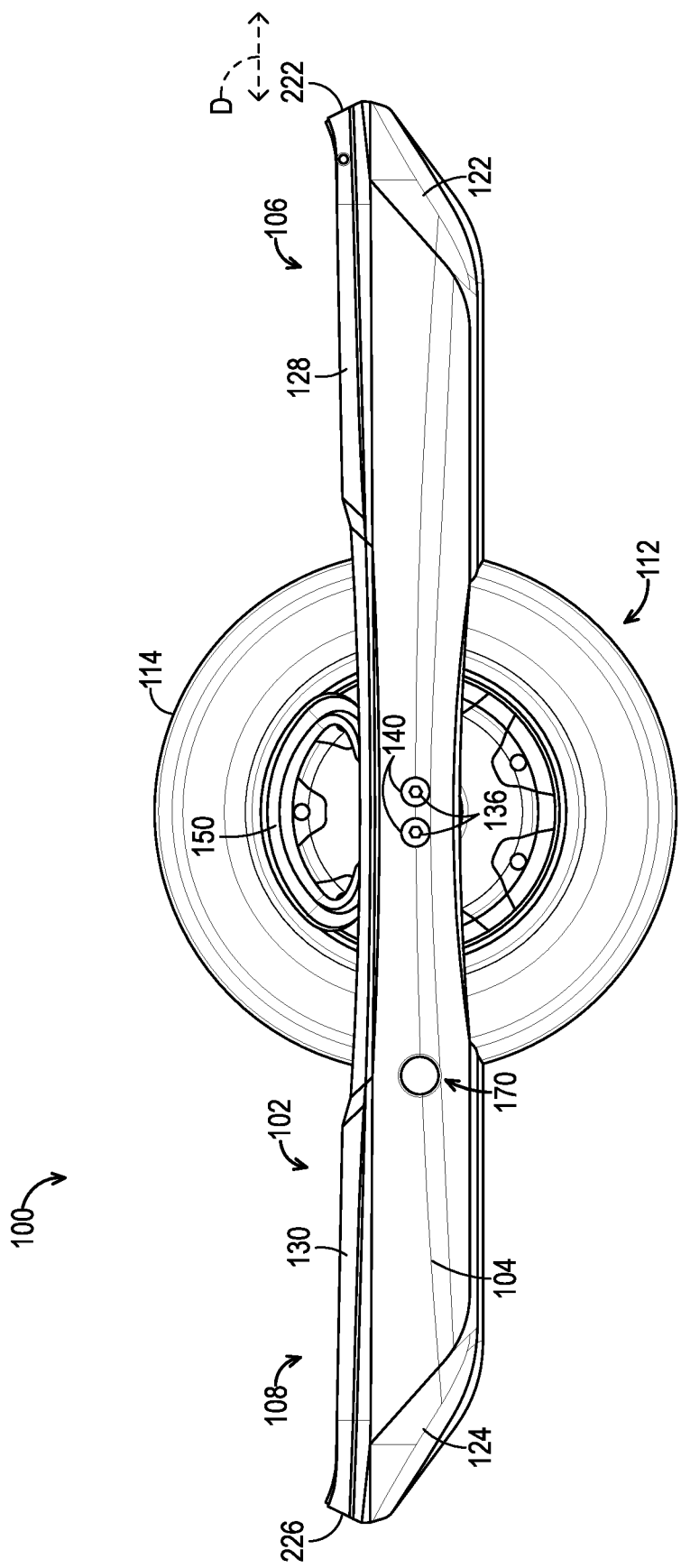
FIG. 5 is a first side elevation view of the skateboard of FIG. 1.
Figure 6:
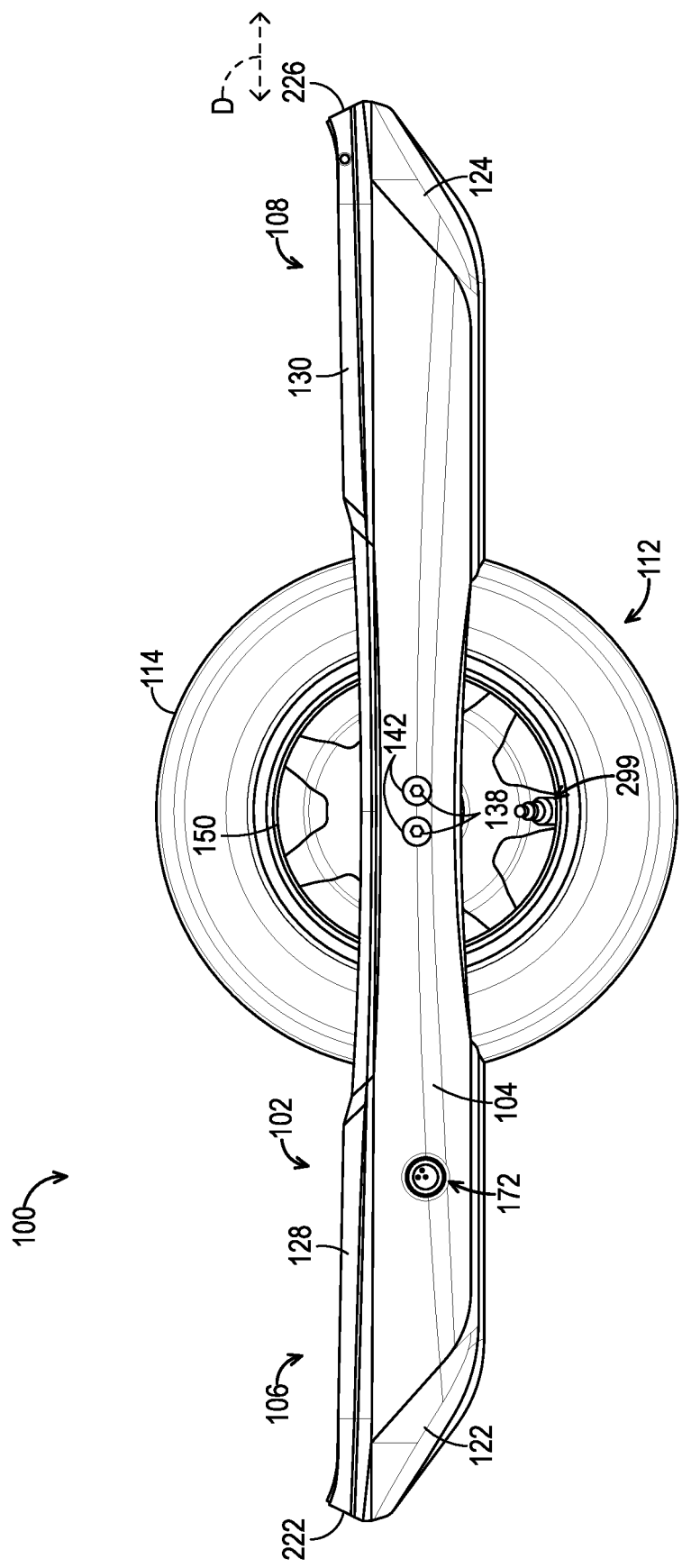
FIG. 6 is a second side elevation view of the skateboard of FIG. 1.
Figure 7:
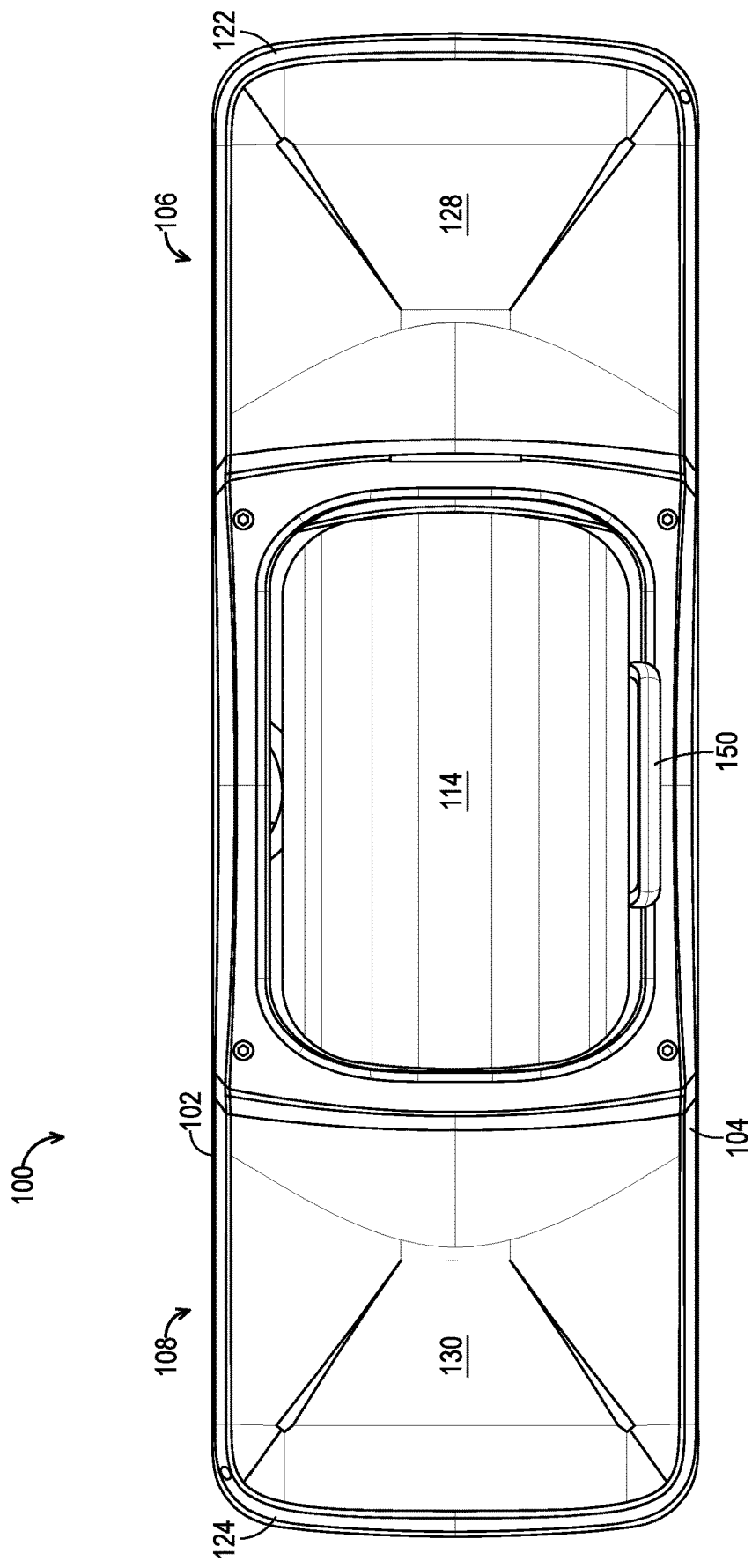
FIG. 7 is a top plan view of the skateboard of FIG. 1.
Figure 8:
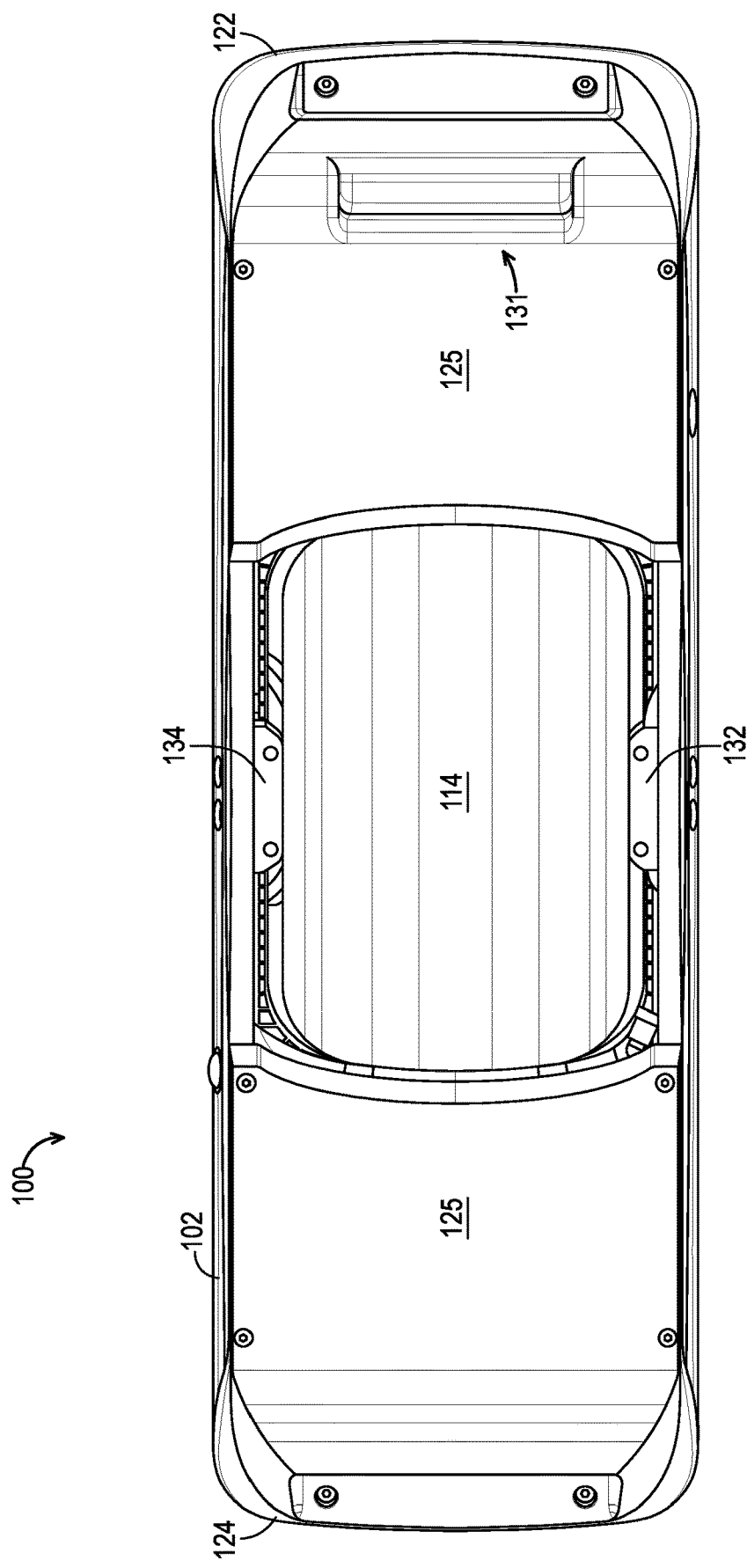
FIG. 8 is a bottom plan view of the skateboard of FIG. 1.
Figure 9:
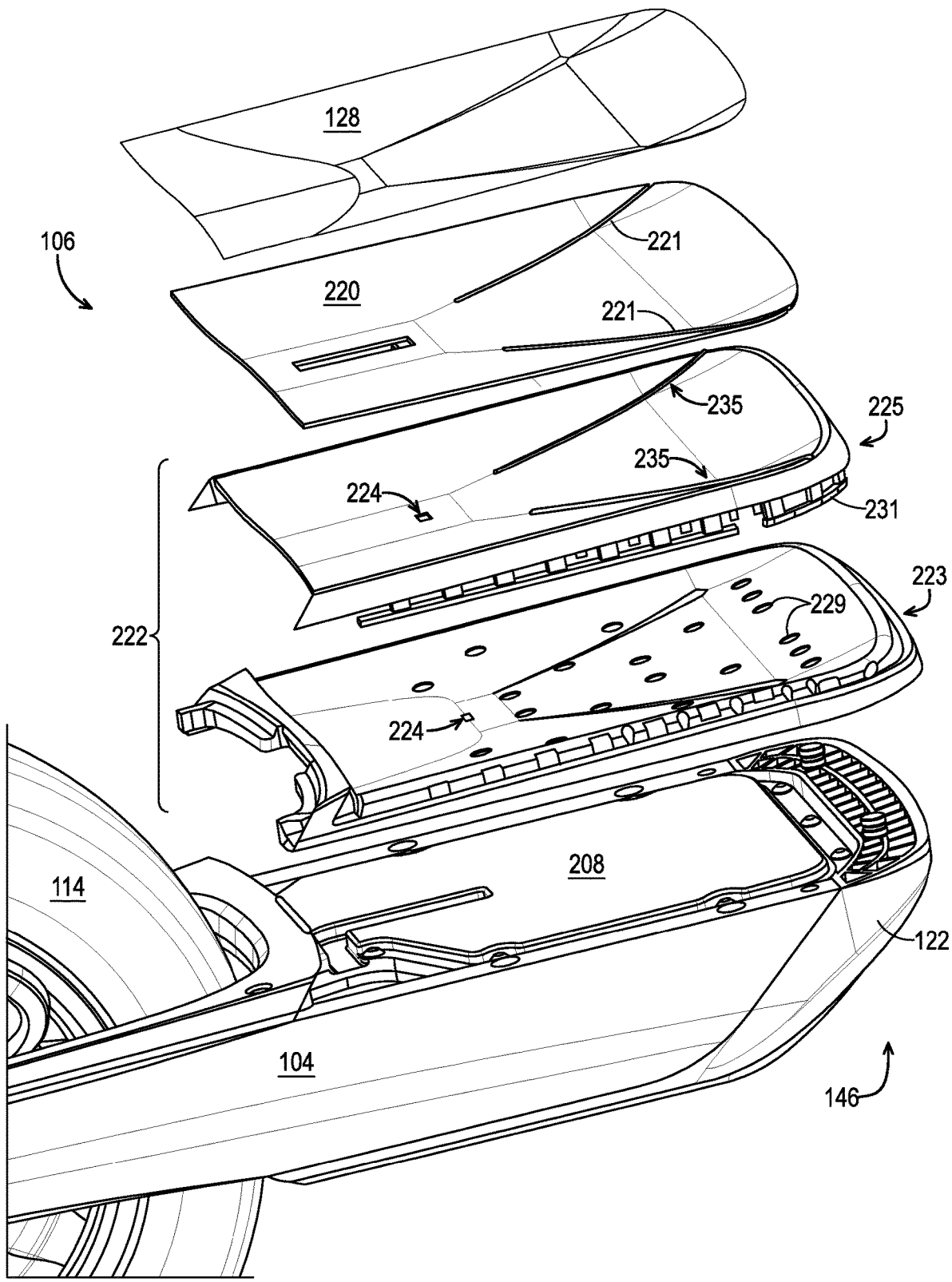
FIG. 9 is a partially exploded, isometric view of a first deck portion of the skateboard of FIG. 1.
Figure 13:
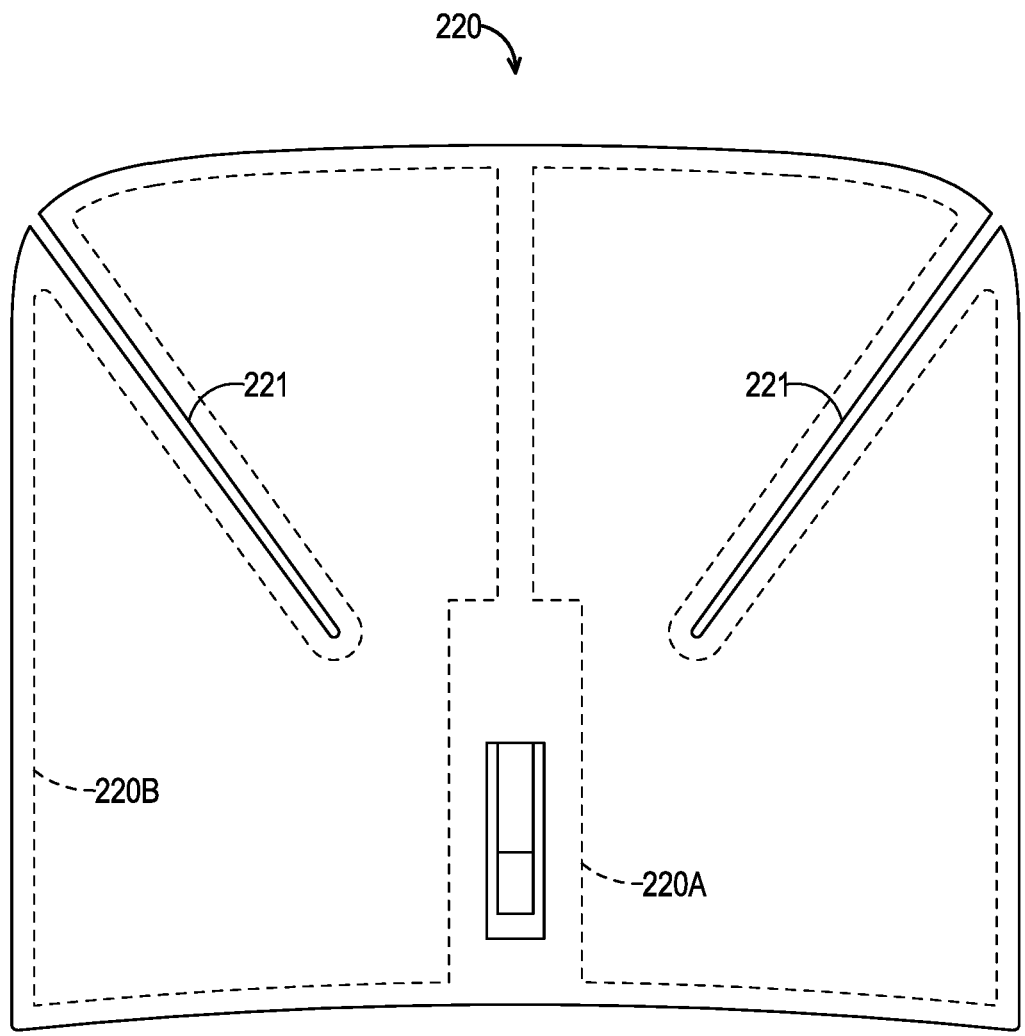
FIG. 13 is a top plan view of a rider detection system in accordance with aspects of the present disclosure.
Figure 14:
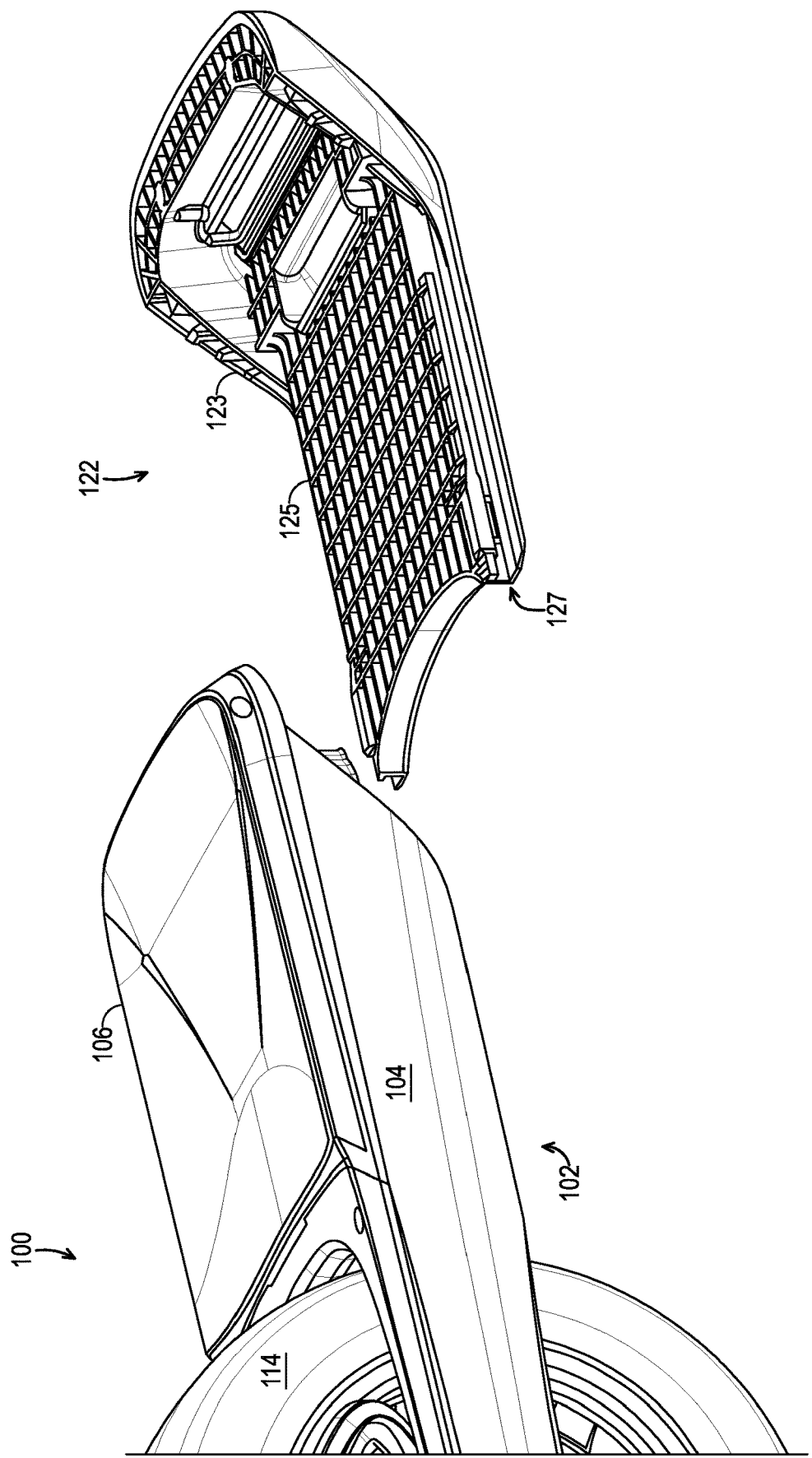
FIG. 14 is a partially exploded, isometric view depicting a bumper for use with the first deck portion of FIG. 9.
Figure 15:
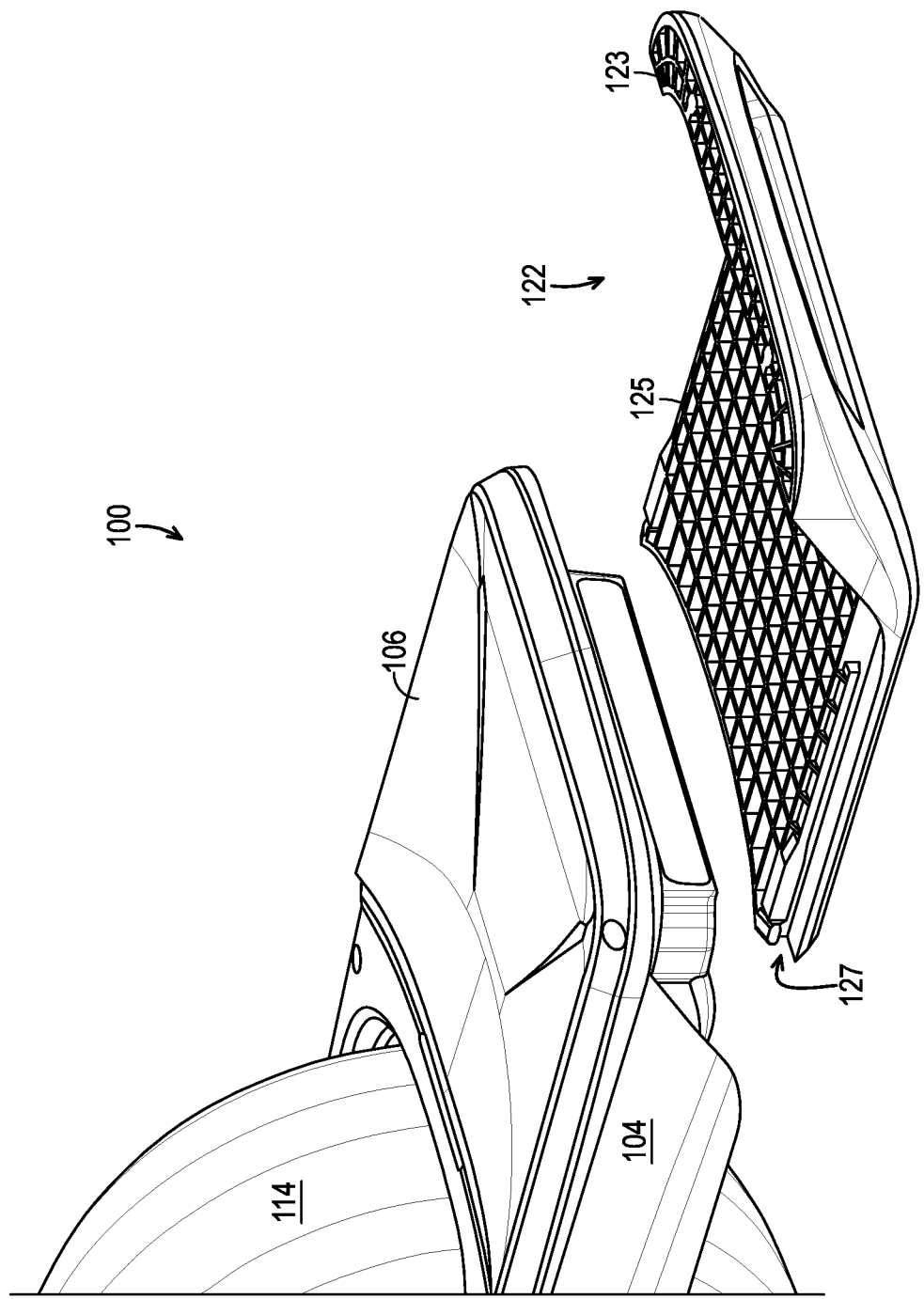
FIG. 15 is another partially exploded, isometric view depicting the bumper of FIG. 14.
Figure 16:
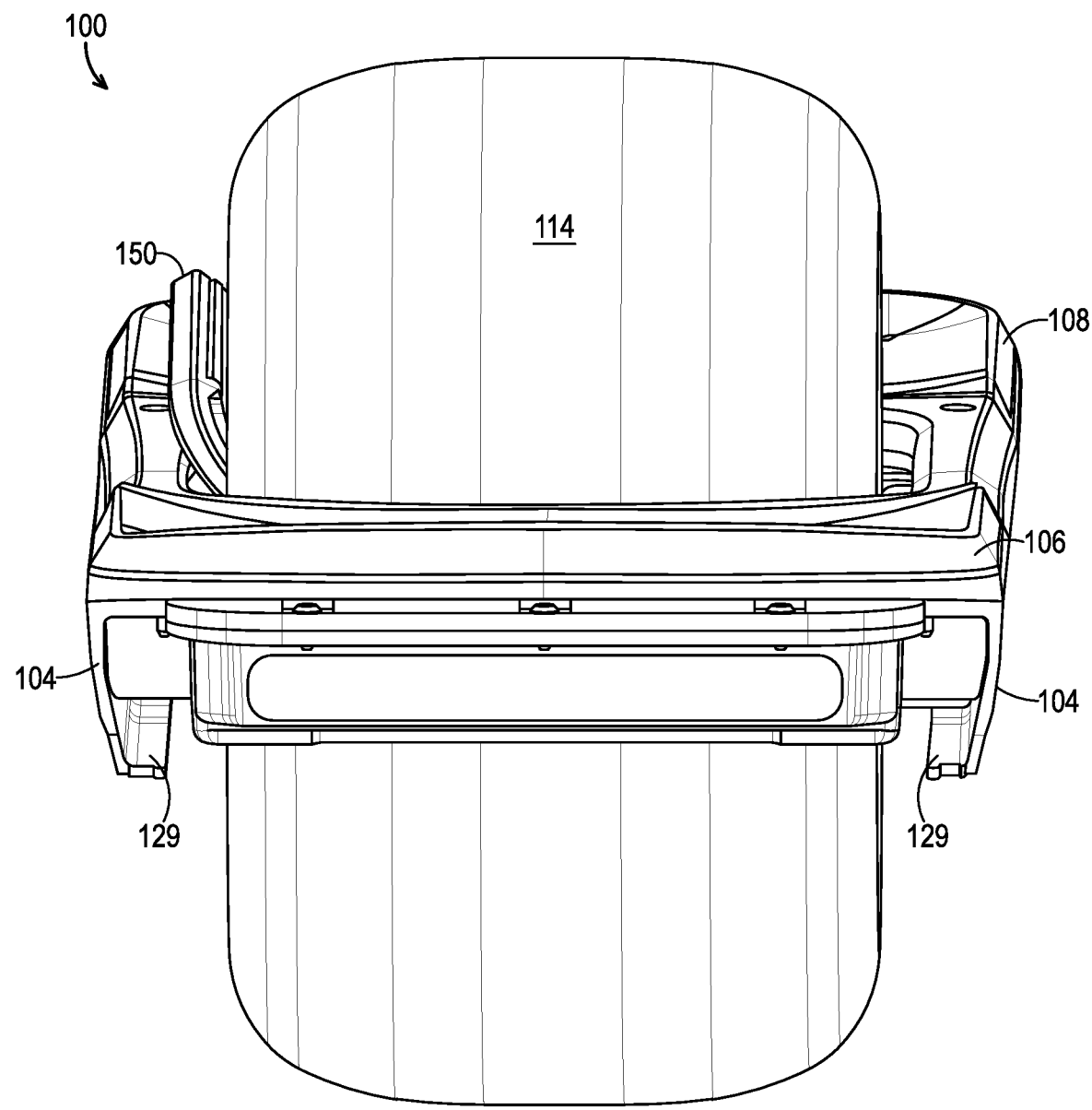
FIG. 16 is an elevated view of the first deck portion of the first deck portion of FIG. 9, without the bumper of FIG. 14.
Figure 22:
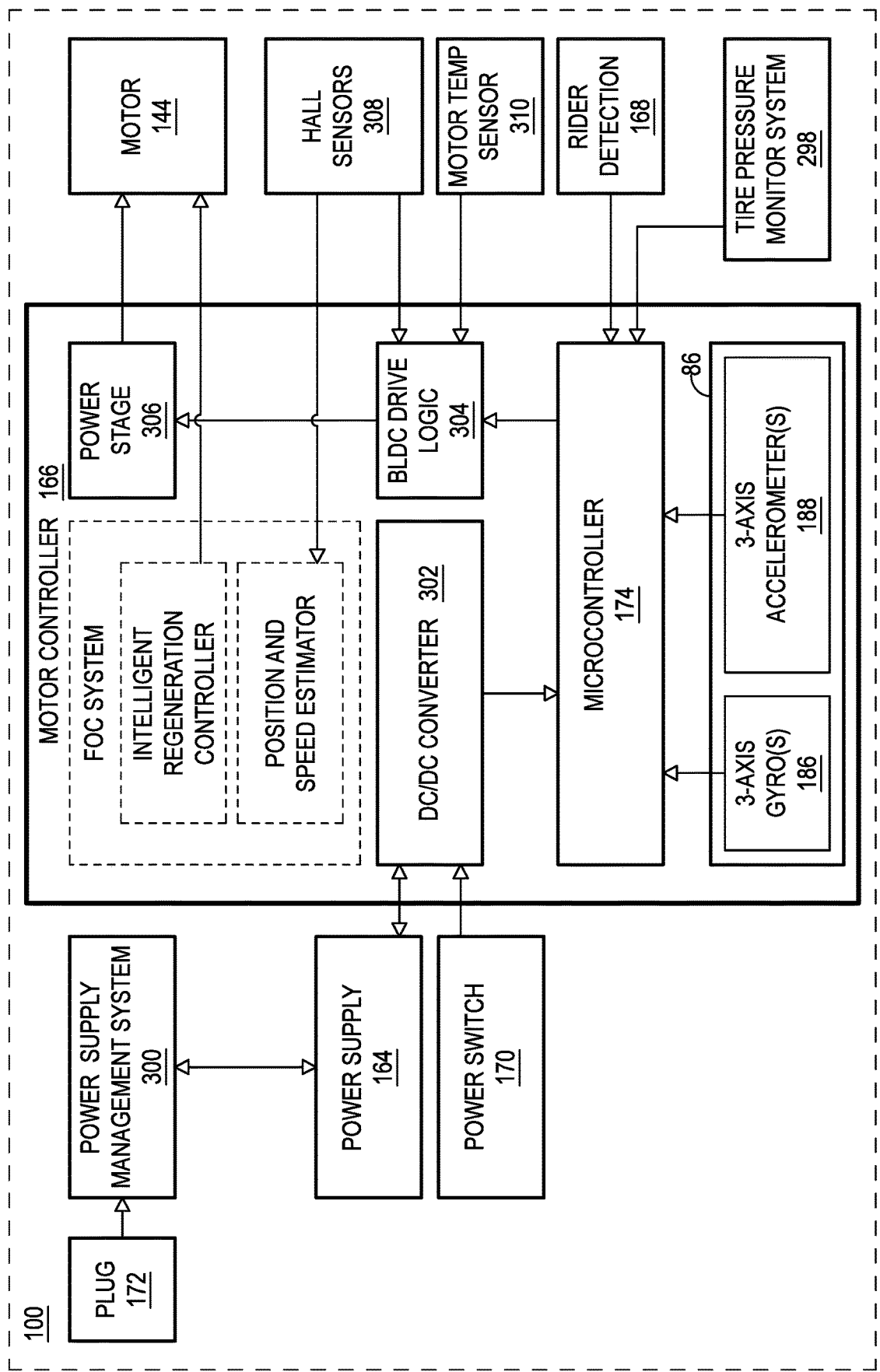
FIG. 22 is a schematic block diagram of a control system suitable for use with the skateboard of FIG. 1.

As indicated in FIG. 22, and depicted variously in FIGS. 2, 9, 13, and elsewhere, the one or more electrical components of vehicle 100 may include a power supply 164, a motor controller 166, a rider detection device 168, a power switch 170, and a charge plug receptacle 172. Further description is provided below, with respect to FIG. 22.

Power supply 164 may include one or more batteries (e.g., secondary or rechargeable batteries), such as one or more lithium-ion batteries that are relatively light in weight and have a relatively high power density. In some examples, power supply 164 may include one or more lithium iron phosphate batteries, one or more lithium polymer batteries, one or more lithium cobalt batteries, one or more lithium manganese batteries, or a combination thereof. For example, power supply 164 may include sixteen (16) A123 lithium iron phosphate batteries (e.g., size 8050). The batteries of power supply 164 may be arranged in a 16S1P configuration, or any other suitable configuration.

Motor controller 166 will generally include suitable electronics for controlling the vehicle motor. For example, a microcontroller 174 and/or one or more sensors (or at least one sensor) 176 may be included in or connected to motor controller 166 (see FIG. 22). At least one of sensors 176 may be configured to measure orientation information (or an orientation) of board 102. For example, sensors 176 may be configured to sense movement of board 102 about and/or along the pitch, roll, and/or yaw axes. The motor may be configured to cause rotation of wheel 114 based on the orientation of board 102. In particular, motor controller 166 may be configured to receive orientation information measured by the at least one sensor of sensors 176 and to cause motor assembly 116 to propel the electric vehicle based on the orientation information. For example, motor controller 166 may be configured to drive hub motor 144 based on received sensed movement of board 102 from sensors 176 via microcontroller 174 to propel and/or actively balance vehicle 100.

In general, at least a portion of the electrical components are integrated into board 102. For example, board 102 includes a first environmental enclosure that houses power supply 164, and a second environmental enclosure that houses motor controller 166. The environmental enclosures are configured to protect the one or more electrical components from being damaged, such as by water ingress.

Vehicle 100 further includes a plurality of light assemblies, such as one or more headlight and/or taillight assemblies (see, e.g., FIGS. 3 and 4), and a battery indicator. For example, a first headlight/taillight assembly (or first light assembly) 180 may be disposed on or at (and/or connected to) first end portion 146 of the board (e.g., at a distal end portion of first deck portion 106), and a second headlight/taillight assembly 182 may be disposed on or at (and/or connected to) second end portion 148 of the board (e.g., at a distal end portion of second deck portion 108).

Headlight/taillight assemblies 180, 182 may be configured to reversibly light vehicle 100. For example, assemblies 180, 182 may indicate the direction that vehicle 100 is moving by changing color. For example, the headlight/taillight assemblies may each include one or more high output RGB and/or red and white LEDs (or other suitable one or more illuminators) 184 configured to receive data from microcontroller 174 (and/or a pitch sensor or sensors 176, such as a 3-axis gyro(s) 186 or accelerometer(s) 188) and automatically change color (e.g., from red to white, white to red, or a first color to a second color) based on the direction of movement of vehicle 100. The first color shines in the direction of motion and the second color shines backward (e.g., opposite the direction of motion). For example, one or more of the headlight/taillight assemblies (e.g., their respective illuminators) may be coupled to microcontroller 174 via an LED driver, which may be included in or connected to motor controller 166.

In some embodiments, the illuminators of assemblies 180, 182 may include RGB/RGBW LEDs. In a preferred embodiment, each LED is individually addressable, such that user adjustment of lighting color is permitted. Additional functionality, such as turn signal indication/animation and/or vehicle state information (e.g., battery state, operational vs. disabled by interlock, etc.) may also be provided.

Assemblies 180, 182 and their associated illuminators may be located in and/or protected by bumpers 122, 124. For example, bumpers 122, 124 may include respective apertures 200, 202, through which illuminators may shine. Apertures 200, 202 may be dimensioned to prevent the illuminators from contacting the ground. For example, apertures 200, 202 may each have a depth or inset profile.

Vehicle 100 may also include a power supply status indicator, specifically a battery indicator 204 comprising one or more illuminators 206 (e.g., LEDs) disposed within a housing 208 of motor controller 166. Battery indicator 204 may include any suitable illuminator(s) configured to indicate a state of power supply 164, e.g., by way of a signal provided to the battery indicator by the microcontroller and/or directly or indirectly from the power supply. Battery indicator 204 is viewable by a rider, e.g., during operation of the vehicle, through an aperture or slot 210 formed in an upper side of one of the foot pads.

In this example, battery indicator 204 is an LED strip visible to the rider. Seven illuminators 206 are provided, using RGB-capable LED lights, although more or fewer may be utilized. The LED strip is programmable, and configured to display a battery state of charge as a bar graph and/or by a color (e.g., starts green when fully charged, goes through yellow, to red when nearing full discharge). The LED strip may also flash error codes, display status of footpad zone activation (i.e., via rider detection system 168), display alerts/alarms, blink code warnings, and/or the like. In some examples, LED behavior may be programmed to disappear while riding and only fade back in when stopped (or below a threshold speed). This mode of operation prevents the rider from looking down while riding. One or more of the above-described modes may be remotely selectable by a user. In some examples, the modes and, for example, a brightness adjustment, may be controllable from a software application running on a user's smartphone or other mobile device. In some examples, brightness may be based on either absolute brightness setting, or some other variable, e.g., a time of day adjustment (dimmer at night).

To facilitate and enhance viewing of illuminators 206 through slot 210, a portion of housing 208 includes a light pipe 212 extending from adjacent the illuminators to (and in some examples, into) the slot. Light pipe 212 may include any suitable structure configured to transmit light from the illuminators (e.g., mounted on a circuit board within the controller housing) to the slot 210. For example, light pipe 212 may be an optical fiber or a solid transparent material, and may be flexible or rigid. In this example, light pipe 212 is formed as a wide column of solid transparent material to cover a linear array of LED illuminators at a lower end and to interface with or fit into slot 210 at an upper end. In some examples, an upper portion of light pipe 212 fills slot 210, thereby plugging the slot and preventing or reducing the incursion of debris and the like. Light pipe 212 may be formed as a single piece with a lid 214 of housing 208, which is coupled to the base of the housing. Some or all of housing 208 may comprise a transparent material (e.g., clear polycarbonate), which may include optical windows for the headlights and battery indicator LEDs. Areas of the housing that are not used as optical windows may be aggressively textured (e.g., on both the inside and outside surfaces) to prevent visibility into the controller housing. Using a clear material with etching or texturing, rather than assembling clear windows into an opaque controller housing, helps to simplify construction and prevent potential seal failure points.

Turning to FIG. 9, an illustrative arrangement of components within the front deck portion will now be described. FIG. 9 is a partially exploded view of front deck portion 106. As depicted, deck portion 106, in this example, includes nonskid sheet 128, which is layered on a membrane switch 220 (see FIG. 13) of rider detection system 168, which in turn is disposed on a first footpad 222 (AKA the front footpad). Footpad 222 may include any suitable rigid, generally planar structure configured to support the rider on board 102. In this example, footpad 222 is thicker on one end, such that an upper surface of footpad 222 is ramped or curved upward slightly toward end 146 of the board. Footpad 222 is coupled directly to frame 104, and supported thereon. One or more apertures 224 are provided in footpad 222 for receiving conductors (e.g., wires) to connect membrane switch 220 with motor controller 166. Motor controller 166 is housed (at least partially) in housing 208, which is disposed under footpad 222 within the board. An undercarriage is provided by an extension of front bumper 122 (e.g., the expanse of the bumper), or in some examples by a separate housing or expanse of rigid material.

Deck portion 108, similarly includes nonskid sheet 130, which is disposed on a second footpad 226 (AKA the rear footpad). Footpad 226 may include any suitable rigid, generally planar structure configured to support the rider on board 102. In this example, footpad 226 is thicker on one end, such that an upper surface of footpad 226 is curved upward slightly toward end 148 of the board. Footpad 226 is coupled directly to frame 104, and supported thereon. Power supply 164 is housed under footpad 226, inside an upper battery cover 228 and a lower battery housing 230. An undercarriage is provided by the battery housing and/or an extension of rear bumper 124, or in some examples by a separate housing or expanse of rigid material.

Figure 10:
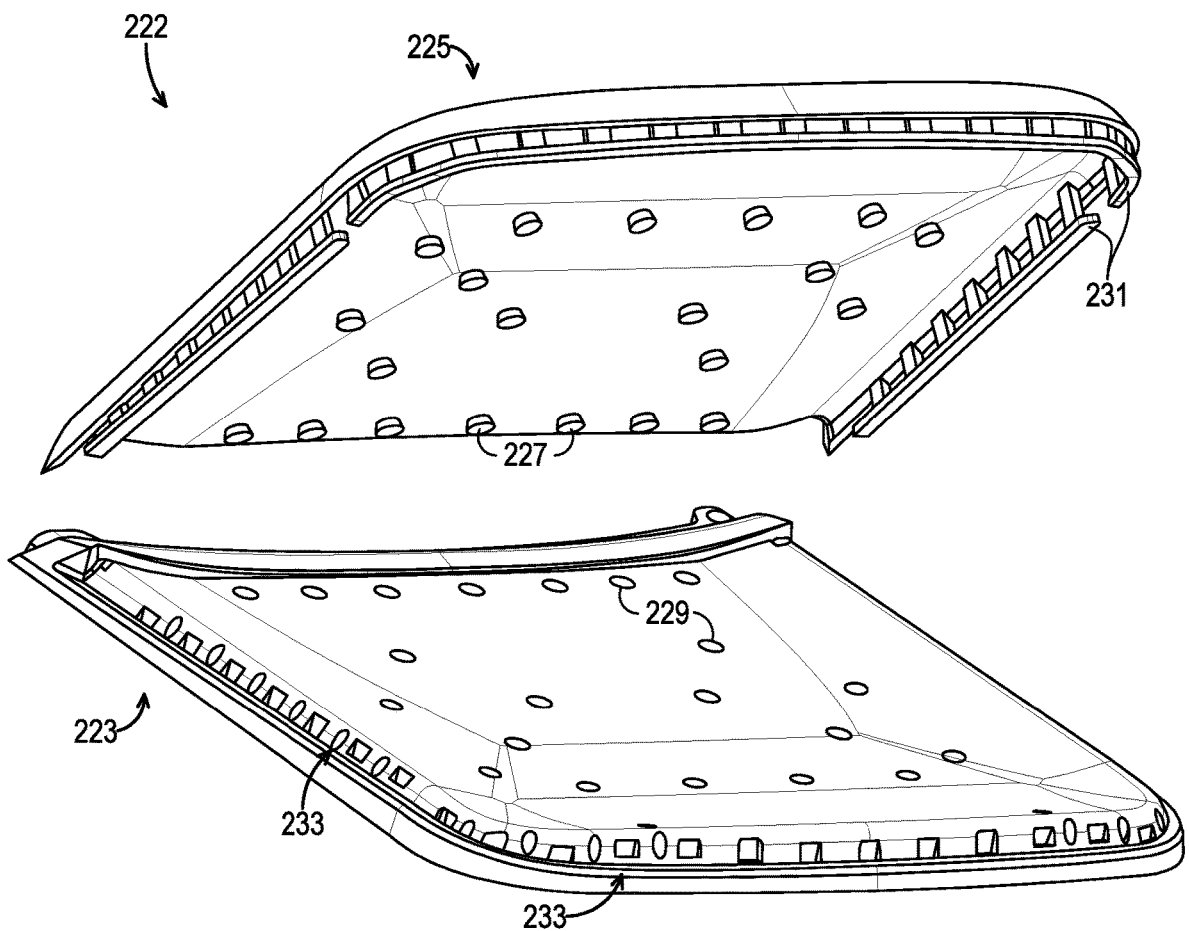
FIG. 10 is an exploded view of a footpad of the first deck portion of FIG. 9.

As depicted in FIG. 10, each of the concave footpads may include a rigid substrate 223 with a compliant or resilient layer 225 disposed thereon. The rigid substrate may include any suitable material and structure configured to support a rider's weight, such as a thermoplastic polymer, e.g., acrylonitrile butadiene styrene (ABS), polyethylene (PE), polyvinyl chloride (PVC), and/or the like. The resilient layer may comprise an elastomer, e.g., a synthetic and/or natural rubber, or another suitably resilient material, e.g., a high-density foam. In some examples, resilient layer 225 is overmolded onto rigid substrate 223.

Rigid substrate 223 and resilient layer 225 may be coupled by one or more mating features configured to provide structural security and additional mechanical stability. For example, resilient layer 225 may include a plurality of downward-facing protrusions 227 received in corresponding apertures 229 in the rigid substrate. Additionally, or alternatively, resilient layer 225 may have a connecting rail 231 mated with a corresponding slot structure 233 of rigid substrate 223, such that, once formed together (e.g., by injection molding the resilient layer onto and through the rigid substrate), the resilient layer and the rigid substrate comprise a single piece incapable of nondestructive disassembly.

Figure 11:
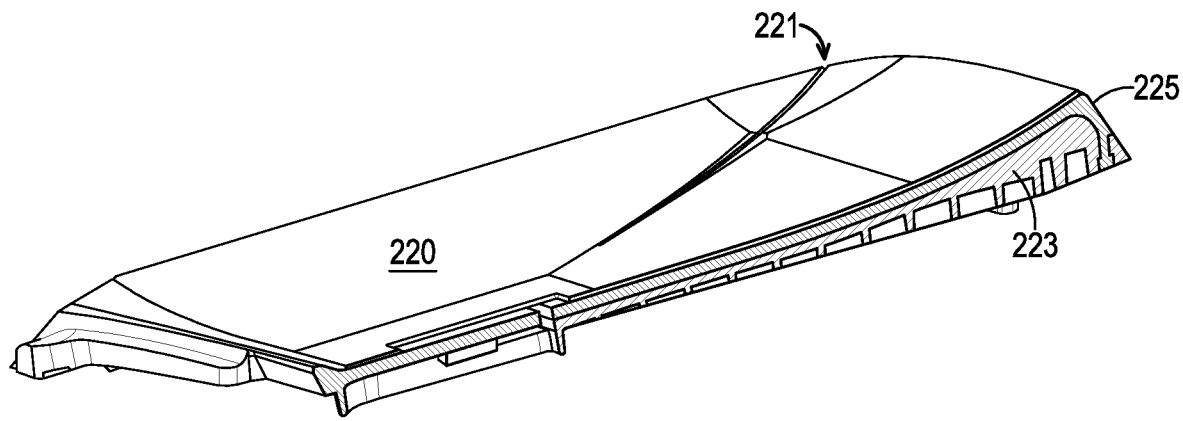
FIG. 11 is an isometric sectional view of the first deck portion of FIG. 9.
Figure 12:
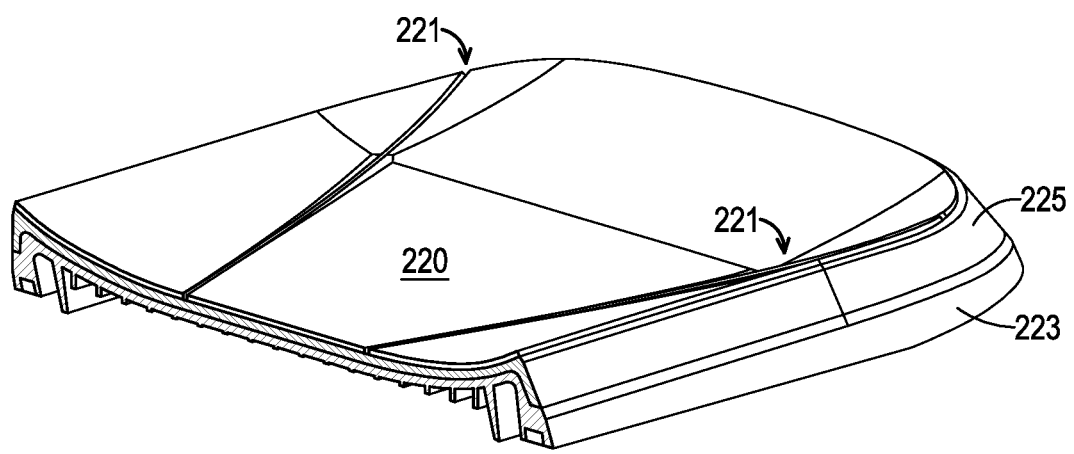
FIG. 12 is another isometric sectional view of the first deck portion of FIG. 9.

As shown in FIGS. 11 and 12, footpad 222 and footpad 226 have a ramped profile in the direction of travel, such that an end portion of each footpad is ramped upward in a direction away from the wheel. In some examples, one or both footpads may be unramped or differently ramped. In the present example, the ramped profile is concave-up in the longitudinal direction. FIGS. 11 and 12 show the footpad with membrane switch 220 installed. One or both of footpads 222 and 226 may include the membrane switch, although examples depicted herein have the membrane switch on a front footpad. In some examples, the footpad is monolithic and made from a single material, instead of the two-layered, interlocked version described above.

Whether or not the footpad is ramped in a longitudinal direction, footpad 222 and footpad 226 may be concave, having a concave-up profile in a heel-toe direction (i.e., laterally). The heel-toe concave-up profile may also be described as being in a direction parallel to the axis of rotation of the wheel, in a direction parallel to the axle, in a direction orthogonal to the direction of travel, and/or in a direction parallel to the pitch or tilt axis. In some examples, one or both footpads are laterally concave and longitudinally ramped. In some examples, one or both footpads are concave-up in more than one direction or on more than one axis. In some examples, one or both footpads have a longitudinal profile that is ramped and concave-up, and a lateral profile that is concave-up.

In this context, a concave footpad (i.e., concave-up laterally) may have any suitable smooth, continuous, and/or faceted concave cross-sectional profile. For example, footpad 222 and/or footpad 226 may have a radial concavity (e.g., having a generally constant radius of curvature), a progressive concavity (e.g., with a smaller radius of curvature closer to lateral edges than at the center), a W-shaped concavity (e.g., with a raised portion in the center), or a tub-shaped or flat-cave concavity (e.g., with a generally flat center and raised lateral edges).

Membrane switch 220 is disposed on the concave front footpad, e.g., between resilient layer 225 and an upper layer of grip tape, and therefore has a similarly concave profile to conform to the footpad. Membrane switch 220 comprises a plastic (e.g., waterproof) laminate housing one or more (e.g., two) force sensitive resistors or other pressure sensors. Membrane switch 220 is an expanse sized and configured to enable simultaneous detection of a toe portion and a heel portion of a rider's foot. Membrane switch 220 comprises a first pressure transducer 220A configured to detect pressure from a first (e.g., toe) portion of the rider's foot, and a second pressure transducer 220B configured to detect pressure from a second (e.g., heel) portion of the rider's foot. In other words, the membrane switch is sized and shaped such that one pressure sensor may be disposed under a toe region of the footpad and the other pressure sensor may be disposed under a heel region of the footpad, such that the presence and stance of a rider can be detected based on which sensor or sensors are activated. Although transducer 220A and transducer 220B have been described as the "toe" and "heel" sensors, the roles of these transducers may be reversed depending on user preference or riding style, e.g., by way of a user-configurable setting.

Membrane switch 220 may be bendable (or flexible, e.g., slightly flexible) in one direction (e.g., on one axis), but may not be capable of compound curvature (e.g., simultaneously on two or more axes) without suffering stress and/or possible failure (e.g., sensor damage). Accordingly, as shown in FIG. 13, membrane switch 220 includes a pair of slots 221 to facilitate conforming to the curvature of footpad 222 and relieve stress on the membrane caused by conforming to the underlying concavity and/or ramped profile of the footpad. Membrane switch 220 has a pair of angled slots in an outer end, forming an end portion and two side portions, such that the side portions of the membrane switch are configured to bend upward to conform to the concave profile of the footpad and the end portion of the membrane switch is configured to bend upward to conform to the ramped profile. The angled slots are each oriented from an outer corner of the membrane toward a central area of the membrane. More or fewer slots may be utilized, depending on the desired concavity and conformity. Corresponding ribs 235 (AKA ridges) protrude upward from resilient layer 225 to accommodate slots 221, e.g., to guide placement and minimize unwanted movement of membrane switch 220.

The concave surface of the footpads may be formed by multiple sloped portions or facets, wherein each facet is planar or has substantial curvature only in a single direction. In some examples, sensor traces of the membrane switch are aligned with the direction of curvature to prevent buckling. In some examples, computational flattening is utilized to convert the curved surface into a flat pattern for manufacturing the membrane switch.

An inboard end of deck portion 106 may be open or uncovered. This opening is covered or substantially sealed, and interior components are protected, by a skirt portion or downward flange of the fender. The fender further includes a peripheral flange configured to seat on frame 104 and be coupled thereto, e.g., by fasteners such as screws or bolts. A dome or arch portion of the fender extends from front and rear ends of the peripheral flange, and is configured to overarch tire 114 from front to rear. On one side, corresponding to the side where handle 150 is mounted, a beveled edge is provided in an inboard side of the flange, to facilitate placement of the handle into the carrying position. A notch is formed in an end of the peripheral flange, such that the notch corresponds with a notch of footpad 222 to form a slot.

Alternatively, a fender substitute (AKA the "fender delete") may be installed in place of the full fender. The fender substitute includes a skirt portion, a peripheral flange, beveled edge, and a notch, all substantially as described above with respect to the fender.

The fender and fender delete are configured to cover and protect the frame members, manage the gap around the tire (e.g., for safety and aesthetics), to snap onto the axle mounting blocks for additional retention, and to provide additional protection from water/mud ingress into motor controller 166 through the open end of deck portion 106.

A tire pressure sensor 298 may be included in vehicle 100, and coupled electrically/electronically to a pressure valve 299 of tire 114. Tire pressure sensor 298 may include any suitable pressure sensor coupled to or integrated into tire 114, e.g., at the valve stem, and configured to sense pneumatic pressure in tire 114. Sensed pressure is communicated, e.g., wirelessly, to the controller and/or a networked device such as a user's mobile digital device (e.g., a smart phone).

A tire pressure management system (TPMS) may be employed on-vehicle and/or as part of a software application (app) running on the mobile device. The management system may function to log tire pressures, display or otherwise provide high- or low-pressure warnings or alerts, and/or communicate the tire pressure for further analysis and display. For example, the TPMS may provide an analysis of the vehicle's range efficiency (e.g., measured in Wh/mi) as a function of the sensed tire pressure. In some examples, tire pressure sensor 298 may communicate tire pressure information to motor controller 166, such that, e.g., in the case of unsafe tire pressure, the motor controller is configured to bring the vehicle to a safe stop.

B. Illustrative Control System

FIG. 22 is a block diagram of various illustrative electrical components of vehicle 100, including onboard controls, some or all of which may be included in the vehicle. The electrical components may include a power supply management system 300 having a battery management system (BMS), a direct current to direct current (DC/DC) converter 302, a brushless direct current (BLDC) drive logic 304, a power stage 306, one or more 3-axis accelerometers 188, one or more 3-axis gyros 186, one or more Hall sensors 308, and/or a motor temperature sensor 310. DC/DC converter 302, BLDC drive logic 304, and power stage 306 may be included in and/or coupled to motor controller 166. In some examples, motor controller 166 may comprise a variable-frequency drive and/or any other suitable drive. Gyro(s) 186 and accelerometer(s) 188 may be included in sensors 176.

Active balancing (or self-stabilization) of the electric vehicle may be achieved through the use of a feedback control loop or mechanism. The feedback control mechanism may include sensors 176, which may be electrically coupled to and/or included in motor controller 166. Preferably, the feedback control mechanism includes a Proportional-Integral-Derivative (PID) control scheme using one or more gyros (e.g., gyro(s) 186) and one or more accelerometers (e.g., accelerometer(s) 188). Gyro 186 may be configured to measure a pivoting of the foot deck about its pitch axis. Gyro 186 and accelerometer 188 may be collectively configured to estimate (or measure, or sense) a lean angle of board 102, such as an orientation of the foot deck about the pitch, roll and/or yaw axes. In some embodiments, gyro 186 and accelerometer 188 may be collectively configured to sense orientation information sufficient to estimate the lean angle of frame 104 including pivotation about the pitch, roll and/or yaw axes.

As mentioned above, orientation information of board 102 may be measured (or sensed) by gyro 186 and accelerometer 188. The respective measurements (or sense signals) from gyro 186 and accelerometer 188 may be combined using a complementary or Kalman filter to estimate a lean angle of board 102 (e.g., pivoting of board 102 about the pitch, roll, and/or yaw axes, with pivoting about the pitch axis corresponding to a pitch angle (about axle 126), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 186 and accelerometer 188 may be connected to microcontroller 174, which may be configured to correspondingly measure movement of board 102 about and/or along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 144 to reduce an angle of board 102 with respect to the ground. For example, if a rider were to angle board 102 downward, so that first deck portion 106 was 'lower' than second deck portion 108 (e.g., if the rider pivoted board 102 counterclockwise (CCW) about axle 126 in FIG. 2), then the feedback loop may drive motor 144 to cause CCW rotation of tire 114 about the pitch axis (i.e., axle 126) and a clockwise force on board 102.

Thus, motion of the electric vehicle may be achieved by the rider leaning his or her weight toward a selected (e.g., "front") foot. Similarly, deceleration may be achieved by the rider leaning toward the other (e.g., "back") foot. Regenerative braking can be used to slow the vehicle, as discussed further below. Sustained operation may be achieved in either direction by the rider maintaining their lean toward either selected foot.

As indicated in FIG. 22, microcontroller 174 may be configured to send a signal to brushless DC (BLDC) drive logic 304, which may communicate information relating to the orientation and motion of board 102. BLDC drive logic 304 may then interpret the signal and communicate with power stage 306 to drive motor 144 accordingly. Hall sensors 308 may send a signal to the BLDC drive logic to provide feedback regarding a substantially instantaneous rotational rate of the rotor of motor 144. Motor temperature sensor 310 may be configured to measure a temperature of motor 144 and send this measured temperature to logic 304. Logic 304 may limit an amount of power supplied to motor 144 based on the measured temperature of motor 144 to prevent the motor from overheating.

In some examples, microcontroller 174 (or another suitable portion of the control system) provides feedback to the user when an error is detected, the vehicle is operating in an unsafe condition, power supplied to motor 144 is about to be limited, the motor is at risk of overheating or overdrawing current, battery charge is low, and/or other potentially dangerous situations. For example, microcontroller 174 may provide haptic feedback (e.g., via a vibration motor within board 102), audible feedback (e.g., via a speaker within board 102), and/or visual feedback (e.g., via color changes and/or light patterns using illuminators 206). In some examples, feedback may be provided to the user via a mobile digital device such as a smartphone alert.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of board 102).

Alternatively or additionally, some embodiments may include neural network control, fuzzy control, genetic algorithm control, linear-quadratic regulator control, state-dependent Riccati equation control, and/or other control algorithms. In some embodiments, absolute or relative encoders may be incorporated to provide feedback on motor position.

In some embodiments, a field-oriented control (FOC) or vector control system may be incorporated into the motor controller (e.g., in microcontroller 174, drive logic 304, and/or any other suitable processing logic of the motor controller). A suitable FOC system may be configured to divert excess regenerative current, thereby acting as a protective mechanism for the battery.

As mentioned above, during turning, the pitch angle can be modulated by the heel-toe angle (e.g., pivoting of the board about the roll axis), which may improve performance and prevent a front inside edge of board 102 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., zero-degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 22, the various electrical components may be configured to manage power supply 164. For example, the battery management system of power supply management system 300 is configured to protect batteries of power supply 164 from being overcharged, over-discharged, and/or short-circuited.

For example, a high voltage threshold may be instituted to stop and/or prevent charging at a selected battery charge percentage (e.g., 95%), and a low voltage threshold may be configured to stop discharging at a selected battery charge percentage (e.g., 5%). The high voltage threshold and low voltage threshold may be configured at the cell level, the battery pack level, or both. In some examples, the high voltage threshold allows more room for energy absorption via regenerative braking by limiting possible overcharging, such as when recently removed from the charger. By raising the low voltage threshold and reducing the high voltage threshold, the cycle life of the battery may be extended. The high voltage threshold and low voltage threshold may be selectively enabled and modified by the user, e.g., through a networked device such as a user's mobile digital device (e.g., smart phone).

System 300 may monitor battery health, may monitor a state of charge in power supply 164, and/or may increase the safety of the vehicle. Power supply management system 300 (AKA a battery charging system) may be connected between a user-accessible charge plug receptacle 172 (AKA charge port) of vehicle 100 and power supply 164. The rider (or other user) may couple a charger to plug receptacle 172 and re-charge power supply 164 via system 300.

As shown in FIGS. 2, 9, 12, and elsewhere, charge receptacle 172 includes three electrical pins configured to mate with female connectors in a corresponding charging plug connectable to the charging port. The three pins include a ground pin 173, an input pin 175, and a third pin 177 (AKA the identification (ID) pin). The charging plug may be a component of an external charging circuit 179, e.g., comprising an alternating current (AC) to direct current (DC) converter (AKA adapter) that receives AC power from a standard home outlet or the like.

The external charging circuit is configured to communicate an identification (ID) signal to the ID pin of the charging port. Accordingly, the charging system of the vehicle receives the identification signal via the third pin, and selectively enables charging of the battery based on the received identification signal. In other words, to enable charging of the rechargeable battery, system 300 (or the BMS of system 300) checks that the signal applied to the ID pin matches a known, expected value (or series of values and/or timing of the series of values). In some examples, the identification signal is a specific voltage, current, or both. System 300 therefore confirms legitimacy of the charger by confirming that the correct identification signal has been applied to the ID pin.

In some examples, the correct (i.e., expected) ID signal varies with respect to time. For example, the correct ID signal may change according to a known sequence of values, a known continuous function, or the like. In some examples, the ID signal utilizes a form of pulse width modulation, in which a selected value and duty cycle are expected by the BMS. For example, the external charging unit may provide an ID signal in pulses at regular or calculable intervals. The magnitude of the ID signal may be higher or lower than a background value, or the ID signal and the background may have overlapping values.

In operation, when an input voltage is detected on the input pin, the BMS checks for the identification signal on the third pin. If the ID signal matches the expected value, then the BMS enables charging of the vehicle. Otherwise, the BMS does not enable charging of the vehicle. In some examples, the charging circuit of the vehicle is disabled by default, with the BMS configured to enable the charging circuit of the vehicle only when a proper ID signal is present from the charger. In some examples, the BMS is configured to actively or affirmatively disable the charging circuit of the vehicle when a proper ID signal is absent.

Accordingly, a device for charging the battery of an electric vehicle (e.g., external charging circuit 179) may include a first plug having three conductors, wherein the first plug is configured to mate with a three-conductor charging receptacle of an electric vehicle, and the three (e.g., female) conductors of the first plug include a direct current (DC) output conductor, a ground, and an identification signal conductor. The device may further include a second plug configured to mate with an alternating-current (AC) outlet, and an AC to DC converter configured to receive an AC current from the second plug and to provide a DC current to the first plug. Furthermore, the device may include a signal generator configured to produce an identification signal comprising a selected value (e.g., a voltage or electrical current magnitude) pulsed periodically in accordance with a selected duty cycle. The signal generator is further configured to provide the identification signal to the identification signal conductor of the first plug.

Accordingly, a method for charging the battery of an electric vehicle (e.g., vehicle 100) may include coupling an alternating current (AC) to direct current (DC) adapter (e.g., external charging circuit 179) to a charging port of the vehicle (e.g., charge receptacle 172). The method includes applying a charging voltage to a first conductor of the charging port, using the AC to DC adapter, and communicating an identification signal to a second conductor of the charging port, wherein the identification signal is configured to match an identification signal expected by the battery management system (BMS) of the vehicle. The method may include generating the identification signal in response to sensing that the adapter has been coupled to the charging port. In some examples, the first and second conductors of the charging port are male connectors (e.g., pins). In some examples, the charging port has a third male connector in the form of a ground pin.

The identification signal comprises a selected value (e.g., a voltage and/or current magnitude) pulsed periodically in accordance with a selected duty cycle. Finally, in response to the BMS enabling the charging system of the vehicle, the method includes charging the secondary battery of the vehicle using the AC to DC adapter. The method may further include coupling the AC to DC adapter to a source of AC electricity (e.g., a household electrical outlet). In some examples, the AC to DC adapter has a first plug configured to mate with the charging port of the electric vehicle and a second plug configured to mate with an AC electrical outlet.

To begin operating the vehicle, power switch 170 may be activated (e.g., by the rider). Activation of switch 170 may send a power-on signal to converter 302. In response to the power-on signal, converter 302 may convert direct current from a first voltage level provided by power supply 164 to one or more other voltage levels. The other voltage levels may be different than the first voltage level. Converter 302 may be connected to the other electrical components via one or more electrical connections to provide these electrical components with suitable voltages.

Converter 302 (or other suitable circuitry) may transmit the power-on signal to microcontroller 174. In response to the power-on signal, microcontroller may initialize sensors 176, and rider detection device 168.

The electric vehicle may include one or more safety mechanisms, such as power switch 170 and/or rider detection device 168 to ensure that the rider is on the board before engaging the feedback control loop. In some embodiments, rider detection device 168 may be configured to determine if the rider's foot or feet are disposed on the foot deck, and to send a signal causing motor 144 to enter an active state when the rider's foot or feet are determined to be disposed on the foot deck.

Rider detection device 168 may include any suitable mechanism, structure, or apparatus for determining whether the rider is on the electric vehicle. For example, device 168 may include one or more mechanical buttons, one or more capacitive sensors, one or more inductive sensors, one or more optical switches, one or more force-resistive sensors, and/or one or more strain gauges. Rider detection device 168 may be located on or under either or both of first and second deck portions 106, 108. In some examples, the one or more mechanical buttons or other devices may be pressed directly (e.g., if on the deck portions), or indirectly (e.g., if under the deck portions), to sense whether the rider is on board 102. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 168 may include a hand-held "dead-man" switch.

If device 168 detects that the rider is suitably positioned on the electric vehicle, then device 168 may send a rider-present signal to microcontroller 174. The rider-present signal may be the signal causing motor 144 to enter the active state. In response to the rider-present signal (and/or the board being moved to the level orientation), microcontroller 174 may activate the feedback control loop for driving motor 144. For example, in response to the rider-present signal, microcontroller 174 may send board orientation information (or measurement data) from sensors 176 to logic 304 for powering motor 144 via power stage 306.

In some embodiments, if device 168 detects that the rider is no longer suitably positioned or present on the electric vehicle, device 168 may send a rider-not-present signal to microcontroller 174. In response to the rider-not-present signal, circuitry of vehicle 100 (e.g., microcontroller 174, logic 304, and/or power stage 306) may be configured to reduce a rotational rate of the rotor relative to the stator to bring vehicle 100 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 144 even though the rider may not be present on the vehicle (e.g., temporarily), which may allow the rider to perform various tricks. For example, device 168 may be configured to delay sending the rider-not-present signal to the microcontroller for a predetermined duration of time, and/or the microcontroller may be configured to delay sending the signal to logic 304 to cut power to the motor for a predetermined duration of time.

C. Illustrative Combinations and Additional Examples

This section describes additional aspects and features of the vehicle and control system described herein, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A self-balancing electric vehicle, comprising:
  a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
  a wheel assembly including a wheel rotatable about an axle, wherein the wheel is disposed between and extends above and below the first and second deck portions;
  a motor assembly configured to rotate the wheel about the axle to propel the vehicle; and
  an electronic controller configured to receive orientation information of the board measured by at least one sensor and to cause the motor assembly to propel the vehicle based on the orientation information;
  wherein the first deck portion includes a concave first footpad having a concave-up profile in a heel-toe direction.

A1. The vehicle of A0, wherein the first footpad has a ramped profile in the direction of travel, such that an end portion of the first footpad is ramped upward in a direction away from the wheel.

A2. The vehicle of A1, wherein the ramped profile is concave-up.

A3. The vehicle of any one of A0 through A2, further including a rider detection system comprising a membrane switch having one or more pressure transducers; wherein the membrane switch is layered onto the concave first footpad.

A4. The vehicle of A3 wherein the membrane switch has a pair of angled slots in an outer end, forming an end portion and two side portions, such that the side portions of the membrane switch are configured to bend upward to conform to the concave profile of the first footpad and the end portion of the membrane switch is configured to bend upward to conform to the ramped profile of the first footpad.

A5. The vehicle of A4, wherein the angled slots are each oriented from an outer corner of the membrane toward a central area of the membrane.

A6. The vehicle of A4 or A5, wherein the footpad includes a pair of ridges configured to fit into the slots of the membrane switch.

A7. The vehicle of any one of A3 through A6, wherein the membrane switch has a waterproof outer housing.

A8. The vehicle of any one of A3 through A7, wherein the membrane switch comprises a first pressure transducer configured to detect pressure from a toe portion of a rider's foot, and a second pressure transducer configured to detect pressure from a heel portion of the rider's foot.

A9. The vehicle of A8, wherein at least one of the pressure transducers comprises a force sensitive resistor.

A10. The vehicle of any one of A0 through A9, wherein the first footpad comprises a resilient layer covering a rigid base.

A11. The vehicle of A10, wherein the rigid base comprises a plastic.

A12. The vehicle of A10 or A11, wherein the resilient layer comprises a rubber material.

A13. The vehicle of A10 or A11, wherein the resilient layer comprises a foam.

A14. The vehicle of any one of A10 through A13, wherein the resilient layer is overmolded onto the rigid base.

A15. The vehicle of any one of A10 through A14, wherein the rigid base includes one or more apertures.

A16. The vehicle of A15, wherein the resilient layer includes one or more protrusions received by the one or more underlying apertures of the rigid base.

A17. The vehicle of any one of A0 through A16, wherein a concave rider detection switch is disposed between the first concave footpad and an upper layer of grip tape.

A18. The vehicle of any one of A0 through A17, wherein the second deck portion comprises a second concave footpad.

B0. A self-balancing electric vehicle, comprising:
   a wheel assembly including a wheel having an axis of rotation;
   a board including an aperture to accommodate the wheel, such that the board is tiltable about the wheel, first and second deck portions of the board each configured to receive a left or right foot of a rider oriented generally parallel to the axis of rotation of the wheel;
   an electric hub motor configured to drive the wheel; and
   a controller configured to receive orientation information indicating an orientation of the board and to cause the hub motor to propel the board based on the orientation information;
   wherein the first deck portion includes a concave first footpad having a concave-up profile in a direction parallel to the axis of rotation of the wheel.

B1. The vehicle of B0, wherein the first footpad has a ramped profile, such that an end portion of the first footpad is ramped upward in a direction away from the wheel.

B2. The vehicle of B1, wherein the ramped profile is concave-up.

B3. The vehicle of any one of B0 through B2, further including a rider detection system comprising a membrane switch having one or more pressure transducers; wherein the membrane switch is disposed on the concave first footpad.

B4. The vehicle of B3, wherein the membrane switch has a pair of angled slots in an outer end, forming an end portion and two side portions, such that the side portions of the membrane switch are configured to bend upward to conform to the concave profile of the first footpad and the end portion of the membrane switch is configured to bend upward to conform to the ramped profile of the first footpad.

B5. The vehicle of B4, wherein the angled slots are each oriented from an outer corner of the membrane toward a central area of the membrane.

B6. The vehicle of any one of B3 to B5, wherein the membrane switch has a waterproof outer housing.

B7. The vehicle of any one of B3 through B6, wherein the membrane switch comprises a first pressure transducer configured to detect pressure from a toe portion of the rider's foot, and a second pressure transducer configured to detect pressure from a heel portion of the rider's foot.

B8. The vehicle of B7, wherein at least one of the pressure transducers comprises a force sensitive resistor.

B9. The vehicle of B4 or B5, wherein the footpad includes a pair of diagonal ridges configured to fit into the slots of the membrane switch.

B10. The vehicle of any one of B0 through B9, wherein the first footpad comprises a resilient layer covering a rigid base.

B11. The vehicle of B10, wherein the rigid base comprises a plastic.

B12. The vehicle of B10 or B11, wherein the resilient layer comprises a rubber material.

B13. The vehicle of B10 or B11, wherein the resilient layer comprises a foam.

B14. The vehicle of any one of B10 through B13, wherein the resilient layer is overmolded onto the rigid base.

B15. The vehicle of any one of B10 through B14, wherein the rigid base includes one or more apertures.

B16. The vehicle of B15, wherein the resilient layer includes one or more protrusions received by the one or more underlying apertures of the rigid base.

B17. The vehicle of any one of B0 through B16, wherein a concave rider detection switch is disposed between the first concave footpad and an upper layer of grip tape.

B18. The vehicle of any one of B0 through B17, wherein the second deck portion comprises a second concave footpad.

C0. A self-balancing electric vehicle comprising:
   a wheel assembly including a wheel driven by a hub motor about an axle;
   a board including an aperture to accommodate the wheel, such that the board is tiltable about the wheel, first and second deck portions of the board each configured to receive a left or right foot of a rider oriented generally parallel to the axle; and
   a controller configured to cause the hub motor to propel the board based on board orientation information;
   wherein the first deck portion includes a concave first footpad having a concave-up profile in a direction parallel to the axle.

C1. The vehicle of C0, wherein the first footpad has a ramped profile, such that an end portion of the first footpad is ramped upward in a direction away from the wheel.

C2. The vehicle of C1, wherein the ramped profile is concave-up.

C3. The vehicle of any one of C0 through C2, further including a rider detection system comprising a membrane switch having one or more pressure transducers; wherein the membrane switch is disposed on the concave first footpad.

C4. The vehicle of C3, wherein the membrane switch has a pair of angled slots in an outer end, forming an end portion and two side portions, such that the side portions of the membrane switch are configured to bend upward to conform to the concave profile of the first footpad and the end portion of the membrane switch is configured to bend upward to conform to the ramped profile of the first footpad.

C5. The vehicle of C4, wherein the angled slots are each oriented from an outer corner of the membrane toward a central area of the membrane.

C6. The vehicle of any one of C3 to C5, wherein the membrane switch has a waterproof outer housing.

C7. The vehicle of any one of C3 through C6, wherein the membrane switch comprises a first pressure transducer configured to detect pressure from a toe portion of the rider's foot, and a second pressure transducer configured to detect pressure from a heel portion of the rider's foot.

C8. The vehicle of C7, wherein at least one of the pressure transducers comprises a force sensitive resistor.

C9. The vehicle of C4 or C5, wherein the footpad includes a pair of diagonal ridges configured to fit into the slots of the membrane switch.

C10. The vehicle of any one of C0 through C9, wherein the first footpad comprises a resilient layer covering a rigid base.

C11. The vehicle of C10, wherein the rigid base comprises a plastic.

C12. The vehicle of C10 or C11, wherein the resilient layer comprises a rubber material.

C13. The vehicle of C10 or C11, wherein the resilient layer comprises a foam.

C14. The vehicle of any one of C10 through C13, wherein the resilient layer is overmolded onto the rigid base.

C15. The vehicle of any one of C10 through C14, wherein the rigid base includes one or more apertures.

C16. The vehicle of C15, wherein the resilient layer includes one or more protrusions received by the one or more underlying apertures of the rigid base.

C17. The vehicle of any one of C0 through C16, wherein a concave rider detection switch is disposed between the first concave footpad and an upper layer of grip tape.

C18. The vehicle of any one of C0 through C17, wherein the second deck portion comprises a second concave footpad.

D0. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including a wheel rotatable about an axle, wherein the wheel is disposed between and extends above and below the first and second deck portions;
a motor assembly configured to rotate the wheel about the axle to propel the vehicle;
an electronic controller configured to receive orientation information of the board measured by at least one sensor and to cause the motor assembly to propel the vehicle based on the orientation information; and
a bumper coupled to the first end portion of the frame, wherein the bumper comprises a body configured to form a distal external end of the board, and an expanse extending from the body to form a lower external surface of the board;
wherein each lateral edge of the expanse of the bumper includes a lengthwise channel configured to slidingly mate with a corresponding inward protrusion of a respective side rail of the frame.

D1. The vehicle of D0, wherein the body of the bumper is held to the frame by one or more removable fasteners, and an opposite end of the bumper is supported entirely by the side rails and channels.

D2. The vehicle of D0 or D1, wherein the bumper comprises ABS plastic.

D3. The vehicle of any one of D0 through D2, wherein the expanse of the bumper includes an aperture forming a carrying handle.

D4. The vehicle of D3, wherein an electronics enclosure disposed above the expanse of the bumper includes a recess in registration with the aperture of the bumper.

D5. The vehicle of D4, wherein the recess in the electronics enclosure is a blind hole having dimensions corresponding to the aperture in the bumper.

D6. The vehicle of any one of D0 through D5, wherein the inward protrusion runs along a discrete length of each of the side rails.

E0. A self-balancing electric vehicle, comprising:
a wheel assembly including a wheel having an axis of rotation;
a board including an opening to accommodate the wheel, such that the board is tiltable about the wheel, first and second deck portions of the board each configured to receive a left or right foot of a rider oriented generally parallel to the axis of rotation of the wheel;
an electric hub motor configured to drive the wheel;
a controller configured to receive orientation information indicating an orientation of the board and to cause the hub motor to propel the board based on the orientation information; and
a bumper coupled to the first deck portion, wherein the bumper comprises a body configured to form a distal external end of the board, and an expanse extending from the body to form a lower external surface of the board;
wherein each lateral edge of the expanse of the bumper includes a lengthwise channel configured to slidingly mate with a corresponding inward protrusion of a respective side rail of the board.

E1. The vehicle of E0, wherein the body of the bumper is held to the board by one or more removable fasteners, and an opposite end of the bumper is supported entirely by the side rails and channels.

E2. The vehicle of E0 or E1, wherein the bumper comprises ABS plastic.

E3. The vehicle of any one of E0 through E2, wherein the expanse of the bumper includes an aperture forming a carrying handle.

E4. The vehicle of E3, wherein an electronics enclosure disposed above the expanse of the bumper includes a recess in registration with the aperture of the bumper.

E5. The vehicle of E4, wherein the recess in the electronics enclosure is a blind hole having dimensions corresponding to the aperture in the bumper.

E6. The vehicle of any one of E0 through E5, wherein the inward protrusion runs along a discrete length of each of the side rails.

F0. A self-balancing electric vehicle comprising:
 a wheel assembly including a wheel driven by a hub motor about an axle;
 a board including a central opening to accommodate the wheel, such that the board is tiltable about the wheel, first and second deck portions of the board each configured to receive a left or right foot of a rider oriented generally parallel to the axle; and
 a controller configured to cause the hub motor to propel the board based on board orientation information;
 a bumper coupled to the first deck portion, wherein the bumper comprises a body configured to form a distal external end of the board, and an expanse extending from the body to form a lower external surface of the board;
 wherein each lateral edge of the expanse of the bumper includes a lengthwise channel configured to slidingly mate with a corresponding inward protrusion of a respective side rail of the board.

F1. The vehicle of F0, wherein the body of the bumper is held to the board by one or more removable fasteners, and an opposite end of the bumper is supported entirely by the side rails and channels.

F2. The vehicle of F0 or F1, wherein the bumper comprises ABS plastic.

F3. The vehicle of any one of F0 through F2, wherein the expanse of the bumper includes an aperture forming a carrying handle.

F4. The vehicle of F3, wherein an electronics enclosure disposed above the expanse of the bumper includes a recess in registration with the aperture of the bumper.

F5. The vehicle of F4, wherein the recess in the electronics enclosure is a blind hole having dimensions corresponding to the aperture in the bumper.

F6. The vehicle of any one of F0 through F5, wherein the inward protrusion runs along a discrete length of each of the side rails.

G0. A self-balancing electric vehicle, comprising:
 a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
 a wheel assembly including a wheel rotatable about an axle, wherein the wheel is disposed between and extends above and below the first and second deck portions;
 a motor assembly configured to rotate the wheel about the axle to propel the vehicle;
 an electronic controller configured to receive orientation information of the board measured by at least one sensor and to cause the motor assembly to propel the vehicle based on the orientation information; and
 a U-shaped bumper coupled to the second deck portion, wherein the bumper comprises a body configured to form an external end of the board, and a pair of legs extending from the body to form lower longitudinal corners of the board;
 wherein each leg of the bumper includes an inward protrusion configured to slidingly mate with a corresponding lengthwise channel of a battery enclosure of the board.

G1. The vehicle of G0, wherein the body of the bumper is held to the board by one or more removable fasteners, and distal ends of the legs of the bumper are supported entirely by the protrusions and channels.

G2. The vehicle of G0 or G1, wherein the battery enclosure extends downward farther than adjacent side rails of the board, and the channels of the battery enclosure are disposed lower than bottom edges of the side rails.

G3. The vehicle of G2, wherein upper surfaces of the legs of the bumper are in contact with the bottom edges of the side rails.

G4. The vehicle of any one of G0 through G3, wherein a lower surface of the battery enclosure extends between the two legs of the bumper to form an external surface of the board.

G5. The vehicle of G4, wherein the inward protrusion runs along a discrete length of each of the legs.

H0. A self-balancing electric vehicle, comprising:
 a wheel assembly including a wheel having an axis of rotation;
 a board including a central opening to accommodate the wheel, such that the board is tiltable about the wheel, first and second deck portions of the board each configured to receive a left or right foot of a rider oriented generally parallel to the axis of rotation of the wheel;
 an electric hub motor coupled to a battery and configured to drive the wheel; and
 a controller configured to receive orientation information indicating an orientation of the board and to cause the hub motor to propel the board based on the orientation information;
 a U-shaped bumper coupled to the second deck portion, wherein the bumper comprises a body configured to form a distal end of the board, and a pair of legs extending from the body to form lower longitudinal corners of the board;
 wherein each leg of the bumper includes an inward protrusion configured to slidingly mate with a corresponding lengthwise channel of a battery enclosure of the board.

H1. The vehicle of H0, wherein the body of the bumper is held to the board by one or more removable fasteners, and distal ends of the legs of the bumper are supported entirely by the protrusions and channels.

H2. The vehicle of H0 or H1, wherein the battery enclosure extends downward farther than adjacent side rails of the board, and the channels of the battery enclosure are disposed lower than bottom edges of the side rails.

H3. The vehicle of H2, wherein upper surfaces of the legs of the bumper are in contact with the bottom edges of the side rails.

H4. The vehicle of any one of H0 through H3, wherein a lower surface of the battery enclosure extends between the two legs of the bumper to form an external surface of the board.

H5. The vehicle of H4, wherein the inward protrusion runs along a discrete length of each of the legs.

J0. A self-balancing electric vehicle comprising:
- a wheel assembly including a wheel driven by a hub motor about an axle;
- a board including an aperture to accommodate the wheel, such that the board is tiltable about the wheel, first and second deck portions of the board each configured to receive a left or right foot of a rider oriented generally parallel to the axle; and
- a controller configured to cause the hub motor to propel the board based on board orientation information;
- a U-shaped bumper coupled to the second deck portion, wherein the bumper comprises a body configured to form a distal external end of the board, and a pair of legs extending from the body to form lower longitudinal corners of the board;
- wherein each leg of the bumper includes an inward protrusion configured to slidingly mate with a corresponding lengthwise channel of a battery enclosure of the board.

J1. The vehicle of J0, wherein the body of the bumper is held to the board by one or more removable fasteners, and distal ends of the legs of the bumper are supported entirely by the protrusions and channels.

J2. The vehicle of J0 or J1, wherein the battery enclosure extends downward farther than adjacent side rails of the board, and the channels of the battery enclosure are disposed lower than bottom edges of the side rails.

J3. The vehicle of J2, wherein upper surfaces of the legs of the bumper are in contact with the bottom edges of the side rails.

J4. The vehicle of any one of J0 through J3, wherein a lower surface of the battery enclosure extends between the two legs of the bumper to form an external surface of the board.

J5. The vehicle of J4, wherein the inward protrusion runs along a discrete length of each of the legs.

K0. A self-balancing electric vehicle, comprising:
- a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
- a wheel assembly including a wheel rotatable about an axle, wherein the wheel is disposed between and extends above and below the first and second deck portions;
- a motor assembly powered by a rechargeable battery and configured to rotate the wheel about the axle to propel the vehicle;
- an electronic controller configured to receive orientation information of the board measured by at least one sensor and to cause the motor assembly to propel the vehicle based on the orientation information; and
- a battery charging system incorporated into the vehicle and electrically coupled to the battery, the charging system comprising a user-accessible charging port having a ground pin, an input pin, and an identification (ID) pin;
- wherein the charging system of the vehicle is configured to receive an identification signal via the ID pin, and to selectively enable charging of the battery based on the received identification signal.

K1. The vehicle of K0, wherein a battery management system (BMS) of the charging system is configured to check for the identification signal on the ID pin, in response to an input voltage on the input pin.

K2. The vehicle of K1, wherein the BMS is configured to enable the charging system of the vehicle based on a comparison between the identification signal and an expected value.

K3. The vehicle of K2, wherein the identification signal changes over time.

K4. The vehicle of K3, wherein the identification signal comprises the expected value pulsed in accordance with an expected duty cycle.

K5. The vehicle of K2 or K3, wherein the expected value is an expected voltage.

K6. The vehicle of K5, wherein the expected voltage has a magnitude lower than a background voltage.

K7. The vehicle of K2 or K3, wherein the expected value is an expected current.

K8. The vehicle of K0, wherein a battery management system (BMS) of the charging system is configured to check for the identification signal on the ID pin.

K9. The vehicle of K8, wherein the BMS is configured to check for the identification signal in response to an input voltage on the input pin.

K10. The vehicle of K8, wherein the BMS is configured to enable the charging system of the vehicle based on a comparison between the identification signal and an expected value.

K11. The vehicle of K8, wherein the BMS is configured to disable the charging system of the vehicle based on a comparison between the identification signal and an expected value.

K12. The vehicle of K11, wherein the identification signal changes over time.

K13. The vehicle of K12, wherein the identification signal comprises the expected value pulsed in accordance with an expected duty cycle.

K14. The vehicle of K12 or K13, wherein the expected value is an expected voltage.

K15. The vehicle of K14, wherein the expected voltage has a magnitude lower than a background voltage.

K16. The vehicle of K12 or K13, wherein the expected value is an expected current.

K17. The vehicle of any one of K0 through K16, further comprising an external charging circuit connectable to the charging port, wherein the external charging circuit is configured to communicate the identification signal to the ID pin of the charging port.

K18. The vehicle of K17, wherein the external charging circuit comprises an alternating current (AC) to direct current (DC) converter.

L0. A method for charging the battery of an electric vehicle, the method comprising:
- coupling an alternating current (AC) to direct current (DC) adapter to a charging port of an electric vehicle;
- applying a charging voltage to a first conductor of the charging port, using the AC to DC adapter;
- communicating an identification signal to a second conductor of the charging port, wherein the identification signal is configured to match an identification signal expected by a battery management system (BMS) of the vehicle, and wherein the identification signal comprises a selected value pulsed periodically in accordance with a selected duty cycle;
- in response to the BMS enabling the charging system of the vehicle, charging a secondary battery of the vehicle using the AC to DC adapter.

L1. The method of L0, further comprising coupling the AC to DC adapter to a source of AC electricity.

L2. The method of L0 or L1, wherein the selected value of the identification signal comprises a voltage magnitude.

L3. The method of any one of L0 through L2, wherein the selected value of the identification signal comprises an electrical current magnitude.

L4. The method of any one of L0 through L3, wherein the first and second conductors of the charging port are male connectors.

L5. The method of L4, wherein the charging port comprises a third male connector comprising a ground pin.

L6. The method of any one of L0 through L5, wherein the AC to DC adapter comprises a first plug configured to mate with the charging port of the electric vehicle and a second plug configured to mate with an AC electrical outlet.

L7. The method of any one of L0 through L6, further comprising generating the identification signal in response to sensing that the AC to DC adapter has been coupled to the charging port.

L8. The method of any one of L0 through L7, wherein the electric vehicle is a self-balancing electric vehicle, comprising: a wheel assembly including a wheel having an axis of rotation, a board including a central opening to accommodate the wheel, such that the board is tiltable about the wheel, first and second deck portions of the board each configured to receive a left or right foot of a rider oriented generally parallel to the axis of rotation of the wheel, an electric hub motor powered by the secondary battery and configured to drive the wheel, and a controller configured to receive orientation information indicating an orientation of the board and to cause the hub motor to propel the board based on the orientation information.

M0. A device for charging the battery of an electric vehicle, the device comprising:

a first plug having three conductors, wherein the first plug is configured to mate with a three-conductor charging receptacle of an electric vehicle, and the three conductors of the first plug include a direct current (DC) output conductor, a ground, and an identification signal conductor;

a second plug configured to mate with an alternating-current (AC) outlet;

an AC to DC converter configured to receive an AC current from the second plug and to provide a DC current to the first plug; and a signal generator configured to produce an identification signal comprising a selected value pulsed periodically in accordance with a selected duty cycle, wherein the signal generator is further configured to provide the identification signal to the identification signal conductor of the first plug.

M1. The device of M0, wherein the selected value of the identification signal comprises a voltage magnitude.

M2. The device of M0 or M1, wherein the selected value of the identification signal comprises an electrical current magnitude.

M3. The device of any one of M0 through M2, wherein the three conductors of the charging port are female connectors.

Advantages, Features, and Benefits

The different embodiments and examples of the electric skateboard described herein provide several advantages over known solutions for providing comfort, control, and other operating characteristics. For example, illustrative embodiments and examples described herein allow for a membrane switch to be placed on a multi-dimensionally curved footpad, enabling both the front and the rear footpads to have a concave profile.

Additionally, and among other benefits, illustrative embodiments and examples described herein allow an increase of user comfort by decreasing foot fatigue.

Additionally, and among other benefits, illustrative embodiments and examples described herein allow the user to be better alerted in the case that an error or an unsafe condition has occurred.

Additionally, and among other benefits, illustrative embodiments and examples described herein have more than one handle, and therefore allow multiple options for carrying the vehicle by hand.

Additionally, and among other benefits, illustrative embodiments and examples described herein allow fewer fasteners to be used in mounting bumpers to the vehicle, thereby decreasing part count and manufacturing costs while increasing user convenience and simplicity of bumper replacement.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A self-balancing electric vehicle, comprising:

a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;

a wheel assembly including a wheel rotatable about an axle, wherein the wheel is disposed between and extends above and below the first and second deck portions;

a bumper coupled to the first end portion of the frame, wherein the bumper comprises a body configured to form a distal external end of the board, and an expanse extending from the body to form a lower external surface of the board;

wherein each lateral edge of the expanse of the bumper includes a lengthwise channel configured to slidingly mate with a corresponding inward protrusion of a respective side rail of the frame.

2. The vehicle of claim 1, wherein the body of the bumper is held to the frame by one or more removable fasteners, and an opposite end of the bumper is supported entirely by the side rails and channels.

3. The vehicle of claim 1, wherein the expanse of the bumper includes an aperture forming a carrying handle.

4. The vehicle claim 3, wherein an electronics enclosure disposed above the expanse of the bumper includes a recess in registration with the aperture of the bumper.

5. The vehicle of claim 4, wherein the recess in the electronics enclosure is a blind hole having dimensions corresponding to the aperture in the bumper.

6. The vehicle of claim 1, wherein the inward protrusion runs along a discrete length of each of the side rails.

7. A self-balancing electric vehicle, comprising:
- a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
- a wheel assembly including a wheel rotatable about an axle, wherein the wheel is disposed between and extends above and below the first and second deck portions;
- a motor assembly configured to rotate the wheel about the axle to propel the vehicle; and
- a U-shaped bumper coupled to the second deck portion, wherein the bumper comprises a body configured to form an external end of the board, and a pair of legs extending from the body to form lower longitudinal corners of the board;
- wherein each leg of the bumper includes an inward protrusion configured to slidingly mate with a corresponding lengthwise channel of a battery enclosure of the board.

8. The vehicle of claim 7, wherein the body of the bumper is held to the board by one or more removable fasteners, and distal ends of the legs of the bumper are supported entirely by the protrusions and channels.

9. The vehicle of claim 7, wherein the battery enclosure extends downward farther than adjacent side rails of the board, and the channels of the battery enclosure are disposed lower than bottom edges of the side rails.

10. The vehicle of claim 9, wherein upper surfaces of the legs of the bumper are in contact with the bottom edges of the side rails.

11. The vehicle of claim 7, wherein a lower surface of the battery enclosure extends between the two legs of the bumper to form an external surface of the board.

12. The vehicle of claim 7, wherein the inward protrusion runs along a discrete length of each of the legs.

13. A self-balancing electric vehicle, comprising:
- a wheel assembly including a wheel having an axis of rotation;
- a board including a central opening to accommodate the wheel, such that the board is tiltable about the wheel, first and second deck portions of the board each configured to receive a left or right foot of a rider oriented generally parallel to the axis of rotation of the wheel;
- a first bumper coupled to the first deck portion, wherein the first bumper comprises a body configured to form a first distal external end of the board, and an expanse extending from the body to form a lower external surface of the board;
- wherein each lateral edge of the expanse of the first bumper includes a lengthwise channel configured to slidingly mate with a corresponding inward protrusion of a respective side rail of the board; and
- a second, U-shaped bumper coupled to the second deck portion, wherein the second bumper comprises a body configured to form a second distal end of the board, and a pair of legs extending from the body to form lower longitudinal corners of the board;
- wherein each leg of the second bumper includes an inward protrusion configured to slidingly mate with a corresponding lengthwise channel of a battery enclosure of the board.

14. The vehicle of claim 13, wherein the bodies of each of the first and second bumpers are each held to the board by one or more removable fasteners, and opposite ends of the bumpers are supported entirely by the channels.

15. The vehicle of claim 13, wherein the battery enclosure extends downward farther than adjacent side rails of the board, and the channels of the battery enclosure are disposed lower than bottom edges of the side rails.

16. The vehicle of claim 15, wherein upper surfaces of the legs of the second bumper are in contact with the bottom edges of the side rails.

17. The vehicle of claim 13, wherein a lower surface of the battery enclosure extends between the two legs of the second bumper to form an external surface of the board.

18. The vehicle of claim 13, wherein the expanse of the first bumper includes an aperture forming a carrying handle.

19. The vehicle claim 18, wherein an electronics enclosure disposed above the expanse of the first bumper includes a recess in registration with the aperture of the first bumper.

20. The vehicle of claim 19, wherein the recess in the electronics enclosure is a blind hole having dimensions corresponding to the aperture in the first bumper.

* * * * *